United States Patent
Mathew et al.

(10) Patent No.: US 10,623,501 B2
(45) Date of Patent: Apr. 14, 2020

(54) TECHNIQUES FOR CONFIGURING SESSIONS ACROSS CLIENTS

(71) Applicant: Oracle International Corporation, Redwood Shores, CA (US)

(72) Inventors: Stephen Mathew, Bangalore (IN); Ramya Kukehalli Subramanya, Redmond, WA (US); Aarathi Balakrishnan, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 262 days.

(21) Appl. No.: 15/356,384

(22) Filed: Nov. 18, 2016

(65) Prior Publication Data

US 2018/0077243 A1 Mar. 15, 2018

Related U.S. Application Data

(60) Provisional application No. 62/395,222, filed on Sep. 15, 2016.

(51) Int. Cl.
*G06F 15/16* (2006.01)
*H04L 29/08* (2006.01)
*H04L 29/06* (2006.01)

(52) U.S. Cl.
CPC ............ *H04L 67/143* (2013.01); *H04L 67/42* (2013.01)

(58) Field of Classification Search
CPC ... H04L 67/14; H04L 67/143; H04L 61/2007; H04L 67/306; H04L 67/42
See application file for complete search history.

(56) References Cited

U.S. PATENT DOCUMENTS

| 6,041,357 A | 3/2000 | Kunzelman et al. |
| 6,055,637 A | 4/2000 | Hudson et al. |

(Continued)

FOREIGN PATENT DOCUMENTS

| EP | 1864240 | 12/2007 |
| WO | 2013049461 | 4/2013 |

(Continued)

OTHER PUBLICATIONS

U.S. Appl. No. 14/491,076, Notice of Allowance dated Nov. 2, 2017, 11 pages.

(Continued)

*Primary Examiner* — Benjamin M Thieu
(74) *Attorney, Agent, or Firm* — Kilpatrick Townsend & Stockton LLP

(57) ABSTRACT

Techniques are disclosed for providing users of an access management system the capability to manage the user's active sessions. The system may receive a first request by a user at a first device to modify one or more sessions established for the user. The system may access session information about the one or more sessions that are associated with the user, wherein a session of the one or more sessions provides the user with access to one or more resources. The system may send the session information to the first device, the session information causing the first device to display a graphical interface including the session information about the one or more sessions. The system may receive, from the first device, a second request indicating a modification to the session. The system may modify the session in accordance with the modification indicated in the second request.

20 Claims, 13 Drawing Sheets

(56) References Cited

U.S. PATENT DOCUMENTS

| | | | |
|---|---|---|---|
| 6,076,108 A | 6/2000 | Courts et al. | |
| 6,178,511 B1 * | 1/2001 | Cohen | G06F 21/335 |
| | | | 726/6 |
| 6,338,064 B1 | 1/2002 | Ault et al. | |
| 6,385,724 B1 | 5/2002 | Beckman et al. | |
| 6,430,619 B1 | 8/2002 | Sitaraman et al. | |
| 6,811,873 B2 | 11/2004 | Nadkarni | |
| 7,100,195 B1 | 8/2006 | Underwood | |
| 7,137,006 B1 * | 11/2006 | Grandcolas | G06F 21/41 |
| | | | 713/180 |
| 7,225,256 B2 | 5/2007 | Villavicencio | |
| 7,296,290 B2 | 11/2007 | Barriga et al. | |
| 7,426,642 B2 | 9/2008 | Aupperle et al. | |
| 7,437,594 B1 | 10/2008 | Mount et al. | |
| 7,496,953 B2 | 2/2009 | Andreev et al. | |
| 7,525,938 B2 * | 4/2009 | Hurtta | H04W 28/18 |
| | | | 370/328 |
| 7,747,746 B2 | 6/2010 | Thayer et al. | |
| 7,761,911 B2 | 7/2010 | Song | |
| 7,805,529 B2 | 9/2010 | Galluzzo et al. | |
| 7,805,757 B2 * | 9/2010 | Menten | H04L 63/0218 |
| | | | 455/445 |
| 7,818,582 B2 | 10/2010 | Marion et al. | |
| 7,886,000 B1 | 2/2011 | Polis et al. | |
| 7,908,380 B1 | 3/2011 | Chu et al. | |
| 7,996,376 B2 | 8/2011 | Singh et al. | |
| 8,001,232 B1 | 8/2011 | Saulpaugh et al. | |
| 8,073,954 B1 | 12/2011 | Tu et al. | |
| 8,117,649 B2 | 2/2012 | Hardt | |
| 8,244,907 B2 | 8/2012 | Hinton et al. | |
| 8,365,266 B2 | 1/2013 | Bogner | |
| 8,438,635 B2 | 5/2013 | Das et al. | |
| 8,442,943 B2 | 5/2013 | Multer et al. | |
| 8,468,586 B2 | 6/2013 | Koottayi et al. | |
| 8,495,195 B1 | 7/2013 | Abidogun et al. | |
| 8,544,069 B1 | 9/2013 | Subbiah et al. | |
| 8,611,873 B2 | 12/2013 | Onyon et al. | |
| 8,627,435 B2 | 1/2014 | Sirota | |
| 8,627,479 B2 | 1/2014 | Wittenstein et al. | |
| 8,650,305 B2 | 2/2014 | Booth et al. | |
| 8,719,342 B2 * | 5/2014 | Mutikainen | H04L 12/1822 |
| | | | 370/260 |
| 8,738,774 B2 | 5/2014 | Sheng et al. | |
| 8,756,704 B2 | 6/2014 | Castellucci et al. | |
| 8,819,444 B2 | 8/2014 | Shahbazi et al. | |
| 8,843,997 B1 | 9/2014 | Hare | |
| 8,898,765 B2 | 11/2014 | Goyal et al. | |
| 8,955,037 B2 | 2/2015 | Srinivasan et al. | |
| 8,990,909 B2 | 3/2015 | Kelley | |
| 9,083,690 B2 | 7/2015 | Subramanya et al. | |
| 9,104,451 B2 | 8/2015 | Subramanya et al. | |
| 9,124,582 B2 | 9/2015 | Kalinichenko et al. | |
| 9,225,744 B1 | 12/2015 | Behm et al. | |
| 9,230,003 B2 | 1/2016 | Goetsch | |
| 9,240,886 B1 | 1/2016 | Allen et al. | |
| 9,247,006 B2 | 1/2016 | Mathew et al. | |
| 9,405,887 B2 | 8/2016 | Yin et al. | |
| 9,509,684 B1 | 11/2016 | Dixson-Boles et al. | |
| 9,544,293 B2 | 1/2017 | Mathew et al. | |
| 9,769,147 B2 | 9/2017 | Mathew et al. | |
| 9,866,640 B2 | 1/2018 | Motukuru et al. | |
| 9,887,981 B2 | 2/2018 | Mathew et al. | |
| 10,009,335 B2 | 6/2018 | Mathew et al. | |
| 10,084,769 B2 | 9/2018 | Mathew et al. | |
| 10,157,275 B1 | 12/2018 | Venkatasamy et al. | |
| 2002/0029269 A1 | 3/2002 | McCarty et al. | |
| 2002/0078365 A1 | 6/2002 | Burnett et al. | |
| 2003/0105862 A1 | 6/2003 | Villavicencio | |
| 2003/0212887 A1 | 11/2003 | Walther et al. | |
| 2004/0003259 A1 | 1/2004 | Chang | |
| 2004/0073666 A1 | 4/2004 | Foster et al. | |
| 2004/0260810 A1 | 12/2004 | Bernoth | |
| 2005/0091655 A1 | 4/2005 | Probert et al. | |
| 2005/0108570 A1 | 5/2005 | Gopalraj | |
| 2005/0120091 A1 | 6/2005 | Casais et al. | |
| 2005/0144482 A1 * | 6/2005 | Anuszewski | G06F 21/41 |
| | | | 726/4 |
| 2006/0059546 A1 | 3/2006 | Nester et al. | |
| 2006/0218630 A1 | 9/2006 | Pearson et al. | |
| 2006/0236382 A1 | 10/2006 | Hinton et al. | |
| 2006/0277596 A1 | 12/2006 | Calvert et al. | |
| 2007/0089167 A1 | 4/2007 | Villavicencio | |
| 2007/0147247 A1 | 6/2007 | Kalonji et al. | |
| 2007/0192326 A1 | 8/2007 | Angal et al. | |
| 2007/0220154 A1 | 9/2007 | El Husseini et al. | |
| 2008/0066159 A1 | 3/2008 | Dillaway et al. | |
| 2008/0113791 A1 | 5/2008 | Williams et al. | |
| 2008/0114883 A1 | 5/2008 | Singh et al. | |
| 2008/0294781 A1 | 11/2008 | Hinton et al. | |
| 2009/0037581 A1 * | 2/2009 | Richardson | H04L 67/08 |
| | | | 709/224 |
| 2009/0037763 A1 | 2/2009 | Adhya et al. | |
| 2009/0047928 A1 | 2/2009 | Utsch et al. | |
| 2009/0089437 A1 | 4/2009 | Polozoff | |
| 2009/0132639 A1 | 5/2009 | Yan | |
| 2009/0216587 A1 | 8/2009 | Dwivedi et al. | |
| 2009/0292927 A1 | 11/2009 | Wenzel et al. | |
| 2010/0043062 A1 | 2/2010 | Alexander et al. | |
| 2010/0082989 A1 | 4/2010 | Bussard et al. | |
| 2010/0131755 A1 | 5/2010 | Zhu et al. | |
| 2010/0146611 A1 | 6/2010 | Kuzin et al. | |
| 2010/0154043 A1 | 6/2010 | Castellucci et al. | |
| 2010/0290392 A1 * | 11/2010 | Rasanen | H04L 12/14 |
| | | | 370/328 |
| 2011/0173643 A1 | 7/2011 | Nicolson et al. | |
| 2011/0185421 A1 | 7/2011 | Wittenstein et al. | |
| 2011/0277019 A1 | 11/2011 | Pritchard, Jr. | |
| 2011/0307615 A1 * | 12/2011 | Krishnaswamy | |
| | | | G06F 16/24539 |
| | | | 709/227 |
| 2012/0078708 A1 | 3/2012 | Taylor et al. | |
| 2012/0106333 A1 | 5/2012 | Lee et al. | |
| 2012/0191842 A1 | 7/2012 | Hu et al. | |
| 2012/0254949 A1 | 10/2012 | Mikkonen et al. | |
| 2012/0254957 A1 | 10/2012 | Fork et al. | |
| 2012/0266229 A1 | 10/2012 | Simone et al. | |
| 2012/0291090 A1 | 11/2012 | Srinivasan et al. | |
| 2013/0036454 A1 | 2/2013 | Purvis et al. | |
| 2013/0073670 A1 | 3/2013 | Das et al. | |
| 2013/0086651 A1 | 4/2013 | Kavantzas et al. | |
| 2013/0086652 A1 | 4/2013 | Kavantzas et al. | |
| 2013/0198818 A1 | 8/2013 | Hitchcock et al. | |
| 2014/0025939 A1 | 1/2014 | Smith et al. | |
| 2014/0068702 A1 | 3/2014 | Hyndman et al. | |
| 2014/0149280 A1 | 5/2014 | Karkhanis et al. | |
| 2014/0259109 A1 | 9/2014 | Houston et al. | |
| 2014/0282961 A1 | 9/2014 | Dorfman et al. | |
| 2014/0304773 A1 | 10/2014 | Woods et al. | |
| 2014/0344326 A1 | 11/2014 | Kamath et al. | |
| 2015/0074407 A1 | 3/2015 | Palmeri et al. | |
| 2015/0082029 A1 | 3/2015 | Volchok | |
| 2015/0088978 A1 | 3/2015 | Motukuru et al. | |
| 2015/0089569 A1 | 3/2015 | Sondhi et al. | |
| 2015/0089570 A1 | 3/2015 | Sondhi et al. | |
| 2015/0089571 A1 | 3/2015 | Srinivasan et al. | |
| 2015/0089579 A1 | 3/2015 | Manza et al. | |
| 2015/0089580 A1 | 3/2015 | Manza et al. | |
| 2015/0089596 A1 | 3/2015 | Sondhi et al. | |
| 2015/0089597 A1 | 3/2015 | Srinivasan et al. | |
| 2015/0089604 A1 | 3/2015 | Mathew et al. | |
| 2015/0089614 A1 | 3/2015 | Mathew et al. | |
| 2015/0089617 A1 | 3/2015 | Sondhi et al. | |
| 2015/0089619 A1 | 3/2015 | Manza et al. | |
| 2015/0089620 A1 | 3/2015 | Manza et al. | |
| 2015/0089622 A1 | 3/2015 | Sondhi et al. | |
| 2015/0089623 A1 | 3/2015 | Sondhi et al. | |
| 2015/0150099 A1 | 5/2015 | Eguchi | |
| 2015/0220713 A1 | 8/2015 | Beenau et al. | |
| 2015/0220926 A1 | 8/2015 | McIachlan et al. | |
| 2016/0004870 A1 | 1/2016 | Forte et al. | |
| 2016/0065570 A1 | 3/2016 | Spencer, III et al. | |
| 2016/0219040 A1 | 7/2016 | Mathew et al. | |
| 2016/0232516 A1 | 8/2016 | Dayan et al. | |

(56) References Cited

U.S. PATENT DOCUMENTS

| | | | |
|---|---|---|---|
| 2016/0248758 A1 | 8/2016 | Mathew et al. |
| 2016/0285822 A1 | 9/2016 | Adams |
| 2016/0380941 A1 | 12/2016 | Tanurdjaja et al. |
| 2016/0381000 A1 | 12/2016 | Mathew et al. |
| 2017/0034152 A1 | 2/2017 | Subramanya et al. |
| 2017/0085556 A1 | 3/2017 | Mathew et al. |
| 2017/0118218 A1 | 4/2017 | Koottayi et al. |
| 2017/0118222 A1 | 4/2017 | Subramanya et al. |
| 2017/0118249 A1 | 4/2017 | Motukuru et al. |
| 2017/0201524 A1 | 7/2017 | Dureau |
| 2018/0046794 A1 | 2/2018 | Mathew et al. |
| 2018/0157825 A1 | 6/2018 | Eksten et al. |

FOREIGN PATENT DOCUMENTS

| | | |
|---|---|---|
| WO | 2015042546 | 3/2015 |
| WO | 2015042547 | 3/2015 |
| WO | 2016051240 | 4/2016 |

OTHER PUBLICATIONS

U.S. Appl. No. 14/754,222, Notice of Allowance dated May 17, 2017, 5 pages.
U.S. Appl. No. 15/005,365, Notice of Allowance dated Sep. 27, 2017, 16 pages.
U.S. Appl. No. 15/143,240, Final Office Action dated Dec. 15, 2017, 14 pages.
U.S. Appl. No. 15/372,342, Non-Final Office Action dated Oct. 20, 2017, 14 pages.
Dacosta et al., One-Time Cookies: Preventing Session Hijacking Attacks with Stateless Authentication Tokens, ACM Trans. Internet Technol. 12, 1, Article 1, 2012, 31 pages.
Pujolle et al., Secure Session Management With Cookies, 7th International Conference on Information, Communications and Signal Processing (ICICS), 2009, pp. 1-6.
Samar, Single Sign-On Using Cookies for Web Applications, Enabling Technologies: Infrastructure for Collaborative Enterprises, (WET ICE '99) Proceedings. IEEE 8th International Workshops on, Stanford, CA, 1999, pp. 158-163.
BIG-IP Access Policy Manager, http://www.f5.com/pdf/products/big-ip-access-policy-manager-ds.pdf, 13 pages.
IBM Security Access Manager for Enterprise Single Sign-On, retrieved from the Internet: <URL: http:I/onwireco.com/wp-content/uploads/2013/12/IBM_Security_Access_Manager For_Enterprise_Single_Sign-On.pdf, 2013, 8 pages.
Impersonate another user: Dynamics CRM 2015, retrieved from the Internet: https://msdn.microsoft.com/en-us/library/gg334744.aspx, 2015, 1 page.
Implementing Single Sign-On Across Multiple Organizations, Developer.force.com, http://wiki.developerforce.com/page/Implementing_Single_Sign-On_Across_Multiple_Organizations, Dec. 19, 2013, 8 pages.
Installing vCenter Single Sign-On in a multisite deployment, retrieved from the Internet: http://kb.vmware.com/selfservice/microsites/search.do!language=en_US&cmd=displayKC&externalId=2034074, 2014, 2 pages.
Multiple Data Centers, retrieved from the Internet: <URL: https://support.ca.com/cadocs/0/CA%20SiteMinder%2012%2052%20SP1-ENU/Bookshelf_Files/HTMUidocs/index.htmtoc.htm706393.htmlintcmp=searchresultclick&resultnum=452, 2014, 8 pages.
Oracle Enterprise Single Sign-On Suite Plus 11gR2 PS2, retrieved from the Internet:http://www.oracle.com/technetworklmiddleware/id-mgmt/essosuite-technical-whitepaper-1519077.pdf, 2014, 25 pages.
Oracle Fusion Middleware Developer's Guide for Oracle Access Management, retrieved from the Internet: <URL: https://docs.oracle.com/cd/E52734_01/oam/ AIDEVIimpersonation.htm#AI DEV422, 2015, 11 pages.
Oracle Fusion Middleware Developing Web Applications, Using Sessions and Session Persistence, Retrieved from the Internet: <URL:http://docs.oracle.com/cd/E12839_01/web.1111/e13712/sessions.htm#WBA PP301, May 2009, 6 pages.
Oracle Fusion Middleware Performance and Tuning for Oracle Weblogic Server, retrieved from the Internet: <URL: http://docs.oracle.com/cd/E12839_01/web.1111/e13814/webapptune.htm#PERFM 368, 2015, 3 pages.
Symantec Identity: Access Manager, retrieved from the Internet :< URL: http://www.symantec.com/contenUen/us/enterprise/fact_sheets/bsymantec_identity_access_manager_DS_21227840, 2014, 2 pages.
Ferguson et al., Session management server: Session transitions and state, retrieved from the Internet: http://www.ibm.com/developerworks/tivoli/library/t-sms-states/, Jun. 25, 2007, 7 pages.
Gaur, IBM Extreme Transaction Processing (XTP) Patterns: Scalable and robust HTTP session management with WebSphere eXtreme Scale, retrieved from the Internet:http://www.ibm.com/developerworks/websphere/library/techarticles/0905_gaur/0905_gaur.html, May 27, 2009, 8 pages.
Haire, A Solution to SSO Authentication and Identity Management: Lessons Learned, Atlassian Blog, May 16, 2013, 5 pages.
Mortimore et al., Implementing Single Sign-On Across Multiple Organizations, retrieved from the Internet: https://developer.salesforce.com/page!Implementing_Single_Sign-On_Across_Multiple_Organizations, 2000-2014, 15 pages.
Murdoch, Hardened stateless session cookies, In International Workshop on Security Protocols, Springer Berlin Heidelberg, Apr. 2008, pp. 1-9.
Rivard, Clearing Novell Access Manager Application Sessions, retrieved from the Internet: <URL: https://www.netiq.com/communities/cool-solutions/clearing-novell-access-managerapplication-sessions/, Jan. 26, 2009, 4 pages.
Stirpe et al., Time-out Management in Multi-domain Single Sign-On, retrieved from the Internet: <URL: http://www.strattagroup.com/tsg/pubs/ssotime-out.pdf, 2005, 13 pages.
Volodarsky et al., Fast, Scalable, and Secure Session State Management for Your Web Applications, retrieved from the Internet: <URL: https://msdn.microsoft.com/enus/magazine/cc163730.aspx, 2015, 9 pages.
Ye, A complete Impersonation Demo in C#.NET, retrieved from the Internet: <URL: http://www.codeproject.com/Articles/12581 0/A-complete-Impersonation-Demo-in-Csharp-NET, Jun. 20, 2013, 12 pages.
U.S. Appl. No. 14/135,053, Final Office Action dated Jul. 6, 2015, 17 pages.
U.S. Appl. No. 14/135,053, Non-Final Office Action dated Jan. 29, 2015, 16 pages.
U.S. Appl. No. 14/135,053, Non-Final Office Action dated Nov. 25, 2015, 18 pages.
U.S. Appl. No. 14/135,053, Notice of Allowance dated May 20, 2016, 10 pages.
U.S. Appl. No. 14/135,053, Notice of Allowance dated Aug. 31, 2016, 9 pages.
U.S. Appl. No. 14/137,775, Non-Final Office Action dated May 22, 2015, 10 pages.
U.S. Appl. No. 14/137,775, Notice of Allowance dated Sep. 16, 2015, 9 pages.
U.S. Appl. No. 14/491,076, Final Office Action dated Oct. 25, 2016, 19 pages.
U.S. Appl. No. 14/491,076, Final Office Action dated Oct. 6, 2016, 19 pages.
U.S. Appl. No. 14/491,076, Non-Final Office Action dated Mar. 11, 2016, 13 pages.
U.S. Appl. No. 14/754,222, Non-Final Office Action dated Dec. 1, 2016, 10 pages.
U.S. Appl. No. 14/814,209, Non-Final Office Action dated Jan. 11, 2017, 13 pages.
U.S. Appl. No. 15/005,365, Final Office Action dated Mar. 10, 2017, 12 pages.
U.S. Appl. No. 15/005,365, Non-Final Office Action dated Aug. 24, 2016, 11 pages.
U.S. Appl. No. 61/880,335, filed Sep. 20, 2013.
U.S. Appl. No. 61/880,400, filed Sep. 20, 2013.
U.S. Appl. No. 61/880,569, filed Sep. 20, 2013.
U.S. Appl. No. 61/880,598, filed Sep. 20, 2013.

(56) References Cited

OTHER PUBLICATIONS

Configuring VMware Identity Manager for Multiple Data Centers, Technical White Paper: VMware Identity Manager 2.8, Available Online at https://www.vmware.com/content/dam/digitalmarketing/vmware/en/pdf/techpaper/vmware-identity-manager-multiple-data-center-configuration.pdf, Dec. 2016, 16 pages.
Multi-Data Center With Session Sharing, IBM Security Access Manager for Web, Version 7.0, Available Online at https://www.ibm.com/support/knowledgecenter/SSPREK_7.0.0/com.ibm.isam.doc_70/ameb_smsdeploy_guide/concept/c_multi_data_center_with_session.html, 2017, 3 pages.
The ABCs of ADCs, White Paper: ABCs of Application Delivery, Available Online at https://www.fortinet.com/content/dam/fortinet/assets/white-papers/FortiADC-ABCs.pdf, 2014, 8 pages.
U.S. Appl. No. 15/143,240, Notice of Allowance dated May 24, 2018, 15 pages.
U.S. Appl. No. 14/814,209, Non-Final Office Action May 14, 2018, 20 pages.
U.S. Appl. No. 15/372,342, Notice of Allowance dated Mar. 13, 2018, 12 pages.
"User Session Monitoring for CA Single Sign-On," CA Technologies, Copyright 2015 http://www.ca.com/~/media/Files/AddOnServicesComponents/user-session-monitor-for-ca-single-sign-on.pdf, 1 page.
"The art of logging out," KTH Sweden, Apr. 26, 2013 https://www.kth.se/social/group/cas/page/the-art-of-logging-out/, 2 pages.
"IBM Security Access Manager for Enterprise Single Sign-On" retrieved from the Internet Nov. 10, 2016: http://www-03.ibm.com/software/products/en/access-mgr-esso, 2 pages.
"Understanding Jive Mobile's SSO Compliance," Jive Software, Jun. 25, 2012 https://community.jivesoftware.com/docs/DOC-61829, 11 pages.
U.S. Appl. No. 14/814,209, Final Office Action dated Jul. 31, 2017, 19 pages.
U.S. Appl. No. 15/143,240, Non-Final Office Action dated Jun. 5, 2017, 11 pages.
Dual Factor Authentication, Reliance, Oct. 24, 2016, 8 pages.
RSA Adaptive Authentication, RSA Security product literature, Available Online at https://www.rsa.com/en-us/products/fraud-prevention/3d-secure-authentication, 2016, 4 pages.
U.S. Appl. No. 14/814,209, Final Office Action dated Jan. 4, 2019, 21 pages.
U.S. Appl. No. 14/814,209, Non-Final Office Action dated Aug. 19, 2019, 20 pages.
U.S. Appl. No. 15/291,804, First Action Interview Pilot Program Pre-Interview Communication dated Jan. 11, 2019, 4 pages.
U.S. Appl. No. 15/291,804, First Action Interview Office Action Summary dated Jun. 17, 2019, 5 pages.
U.S. Appl. No. 15/331,211, Advisory Action dated Feb. 4, 2019, 5 pages.
U.S. Appl. No. 15/331,211, Final Office Action dated Oct. 16, 2018, 34 pages.
U.S. Appl. No. 15/331,211, Non-Final Office Action dated Jun. 6, 2018, 26 pages.
U.S. Appl. No. 15/331,613, First Action Interview Office Action Summary dated May 29, 2019, 7 pages.
U.S. Appl. No. 15/331,613, First Action Interview Pilot Program Pre-Interview Communication dated Jan. 4, 2019, 5 pages.
U.S. Appl. No. 15/331,613, Notice of Allowance dated Jul. 9, 2019, 19 pages.
U.S. Appl. No. 15/331,613, Notice of Allowance dated Aug. 21, 2019, 12 pages.
U.S. Appl. No. 15/707,261, Final Office Action dated Mar. 8, 2019, 6 pages.
U.S. Appl. No. 15/707,261, Notice of Allowance dated Jun. 27, 2019, 5 pages.
U.S. Appl. No. 15/707,261, Non-Final Office Action dated Sep. 13, 2018, 10 pages.
U.S. Appl. No. 15/782,700, Non-Final Office Action dated Jan. 26, 2018, 7 pages.
U.S. Appl. No. 15/782,700, Notice of Allowance dated Aug. 8, 2018, 13 pages.
U.S. Appl. No. 15/784,029, Non-Final Office Action dated Aug. 22, 2019, 14 pages.
U.S. Appl. No. 16/140,343, Non-Final Office Action dated Aug 7, 2019, 11 pages.
Heo et al., "Statistical SIP Traffic Modeling and Analysis System", IEEE, 2010, pp. 1223-1228.
Izumi et al., "Toward Practical Use of Virtual Smartphone", IEEE 9th Asia-Pacific Symposium on Information and Telecommunication Technologies (APSITT), Dec. 12, 2012, pp. 1-5.
Maruyama et al., "Dynamic Route Selection Algorithms for Session Based Communication Networks", ACM, 1983, pp. 162-169.
Menasce et al., "Resource Management Policies for E-commerce Servers", ACM Sigmetrics Performance Evaluation Review, vol. 27, No. 4, Mar. 2000, pp. 27-35.
Nagalakshmi et al., Confident Multi-Factor Authentication on Web Application Via Captcha Technologies, International Journal of Computer Engineering in Research Trends, vol. 2, Issue 8, Aug. 2015, pp. 516-522.
U.S. Appl. No. 15/291,804, Notice of Allowance dated Oct. 22, 2019, 12 pages.
U.S. Appl. No. 15/707,261, Notice of Allowance dated Oct. 11, 2019, 5 pages.

\* cited by examiner

TECHNIQUES FOR CONFIGURING SESSIONS ACROSS CLIENTS

CROSS-REFERENCES TO RELATED APPLICATIONS

This application is a non-provisional application and claims the benefit and priority of U.S. Provisional Application No. 62/395,222, filed on Sep. 15, 2016, entitled "SELF-SERVICE FOR SESSION MANAGEMENT," the content of which is herein incorporated by reference in its entirety for all purposes.

BACKGROUND

An lower authentication level access management system may enable users to have access to one or more different systems and applications. Each of these systems and applications may utilize different access control policies and request different credentials (e.g., user names and passwords). A user wanting to access multiple resources protected by an access management system may need to be authenticated by credentials provided to the access management system. A successful authentication gives the user authorization to access the protected resources, based on their assigned access privileges.

If a user wants to access multiple resources protected by the access management system, the access management system may determine whether the user is authenticated to access the multiple resources requested by a user. In some instances, authentication of a user for one resource may suffice for accessing other resources; otherwise, the access management system may request additional credentials from the user. Upon authentication to access multiple resources, the user may not need to re-authenticate to access additional resources. In such instances, the access management system may maintain a single session, such as a single sign-on session (SSO), which provides a user with access to multiple resources after authentication.

An access management system may provide the user flexibility with regard to (1) where the user may perform a session login, (2) the number of simultaneous sessions that the user may initiate, and (3), which privileges are associated with a session. However, because users may only be able to end a session by performing a logout at the device where the session was initiated, this flexibility may comprise enterprise security in certain situations. For example, if a user creates a session at a device and then loses the device, the user may be unable to end the session at the lost device. In another example, if a user creates a session at a public terminal and then forgets to end the session, it may become inconvenient for the user to end the session if the user moves to another geographic location before remembering that the session was not ended. In another example, if a user that is connected to a remote device over a VPN creates a session at the remote device before the VPN connection fails, the user may be unable to end the session at the remote device if the user is unable to re-establish the VPN connection.

Because non-persistent sessions generally expire automatically after a period of time, the problems described in the above examples may eventually resolve themselves. However, prior to automatically expiring, these sessions are at risk of being abused by unauthorized individuals to access protected resources of the enterprise. Additionally, for persistent sessions, the risk is magnified.

BRIEF SUMMARY

The present disclosure relates to the management of sessions to access resources. Specifically, techniques are disclosed for enabling a user to perform management of sessions via an interface of an access management system. The management of a session may be performed in fine-grain manner. The techniques enable remote termination and modification of sessions without the assistance of an administrator of the access management system.

A session may be managed by a user for which access is permitted for the session, and/or may be managed by a user different from the user for which access is permitted for the session. Access for managing session may be managed by the authentication of a user that is attempting to manage the session. The authentication may include one or more authentication processes in addition to the access permitted for the session.

An access management system can provide a session management interface that can be used to prevent unauthorized individuals from abusing unsecured sessions. The interface enables a user to conduct self-service management for fine-grain control of sessions associated with the user. An access management system may receive a request from a first device operated by a user to access one or more protected resources. Upon receiving the request, the access management system may determine a first authentication of the user to access the one or more resources at the first device, where the first authentication may involve an authentication mechanism that comprises one or more authentication steps. Upon the authentication succeeding, the access management system may establish a session for the user at the first device, thereby allowing the user to access protected resources via the first device.

Upon receiving a request from a second device operated by the user to modify one or more sessions established for the user, the access management system may determine a second authentication of the user to manage the one or more sessions at the second device. The second device may be the first device or a different device from the first device. In some embodiments, the second authentication may involve a stepped-up authentication mechanism that comprises one or more additional steps on top of the one or more authentication steps that are comprised by the authentication mechanism. Upon the authentication succeeding, the access management system may allow the user access to perform self-service management of the user's sessions, which may include the session at the first device, at an interface exposed by the access management system.

In particular, the access management system may access session information of the user's sessions from a data store and send the accessed session information to in a response to the second device. For example, if the user has established a plurality of sessions at a plurality of devices with different internet protocol (IP) addresses, the session information may include information on each of these sessions. In particular, the session information may comprise, for each of these sessions, an IP address of the device for which the session was established, a time period during which the session is configured to be active, an indication of whether the session is persistent, an indication of whether the session is impersonated, an authentication level of the session, an identifier of the session, and an identifier of the user. The response may comprise, in addition to the session information, graphical interface information that may cause the second device to display a graphical interface that includes the session information about the user's sessions. In some embodiments, the graphical interface may display the session information in a tabular format to the user. The graphical interface may also include one or more interactive elements that the user may select to specify modifications to the one or more of the user's sessions. One example of a modification to a session could be a configuration to the session, which can include a plurality of modifications or changes that each correspond to an attribute (i.e., preferences) of the session.

In response to receiving input from the user that specify a modification to a session, the second device may transmit the specified modification in a request to the access management system. Upon receiving the request, the access management system may apply the modification to a representation of the specified session in accordance with the request. In particular, one or more session attributes of the specified session may be changed within the representation. The access management system may send modified session information about the user's sessions, including the modified session, in a response to the second device. The response may comprise, in addition to the modified session information, graphical interface information that may cause the second device to display a graphical interface that includes the modified session information. Using the interface, the user may continue making additional modifications to the user's sessions.

In some embodiments, the second device is the first device. In alternative embodiments, the second device is a different device from the first device.

In some embodiments, the access management system may receive, through a graphical interface from the second device, another request indicating a search to identify, from amongst the user's sessions, a subset of the sessions that are associated with the IP address of a particular device. Upon receiving this request, the access management system may search the data store for the subset in accordance with the search indicated in the request and send session information about the subset to the second device, where the session information about the subset causes the second device to display a graphical interface that displays only the subset of the sessions.

In some embodiments, the access management system may protected one or more resources, the one or more resources comprising a first resource and a second resource. Access to the first resource may be based on whether the session has at least a lower authentication level and access to the second resource may be based on whether the session has at least a higher authentication level, the establishment of the session involving one or more additional authentication steps in addition to the one or more steps used for the establishment of a session with a lower authentication level. In some of these embodiments, the specified session may have the higher authentication level and the change may comprise changing an authentication level of the specified session from the higher authentication level to the lower authentication level so that access to the second resource is revoked. In some other of these embodiments, the specified session may have the lower authentication level and the change may comprise changing the authentication level of the specified session from the lower authentication level to the higher authentication level so that access to the user is provided with access to the second resource at the first device.

In some embodiments, the specified session may be active for a time period, after which access by the user at the second device to the protected resources is revoked and the change corresponds to extending the time period.

In another embodiments of the present disclosure, a device may send, to a computing system of an access management system, a first request by a user at a first device to modify one or more sessions established for the user, wherein a session of the one or more sessions provides the user with access to one or more resources at a second device. In response to a request by the access management system for a first authentication of the user, the device may transmit credential data of the user to the computing system. The device may then receive session information about about the one or more sessions that are associated with the user. The device may then display, to the user, a graphical interface including the session information about the one or more sessions. Next, the device may receive, via the user through the graphical interface, an input indicating a modification to the session that includes a change to an attribute of the session. The device may then send, to the computing system, a second request indicating the modification, wherein the computing system modifies the attribute of the session in accordance with the modification indicated by the second request. In response to receiving, from the computing system, modified session information about the modified session, the device may display an indication about the modified session to the user. Some embodiments disclosed herein may be implemented by a computer system that is configured to implement methods and operations disclosed herein. Yet some embodiments relate to systems, computer products, and machine-readable tangible storage media, which employ or store instructions for methods and operations disclosed herein. In at least one embodiment, systems may include one or more processors and memory. The memory may store instructions that are executable by the one or more processors to perform methods and operations disclosed herein. Systems may include a computer product, systems, portable consumer devices, machine-readable tangible storage media, modules, or a combination thereof, to perform methods and operations disclosed herein.

Embodiments of the present disclosure may provide a number of advantages. The user is able to manage, through a single interface, sessions that the user created across multiple devices. The interface may enable the user to manage sessions created on other devices that otherwise are no longer accessible to the user due to various reasons (e.g., geographic distance, a lost connection, malfunctioning software, or any other sort of technical or physical barrier). Additionally, the interface may provide the user with an intuitive graphical user interface (GUI) that displays relevant information about each of session of the user. Such information may enable a user to monitor sessions across multiple devices, which may help the user to identify security inconsistencies or vulnerabilities stemming from the sessions. Furthermore, the interface may be protected by a stepped-up authentication mechanism, which reduces the risk of the interface being abused via unauthorized access.

The foregoing, together with other features and embodiments will become more apparent upon referring to the following specification, claims, and accompanying drawings.

BRIEF DESCRIPTION OF THE DRAWINGS

Illustrative embodiments of the present disclosure are described in detail below with reference to the following drawing figures.

DETAILED DESCRIPTION

Figure 1:
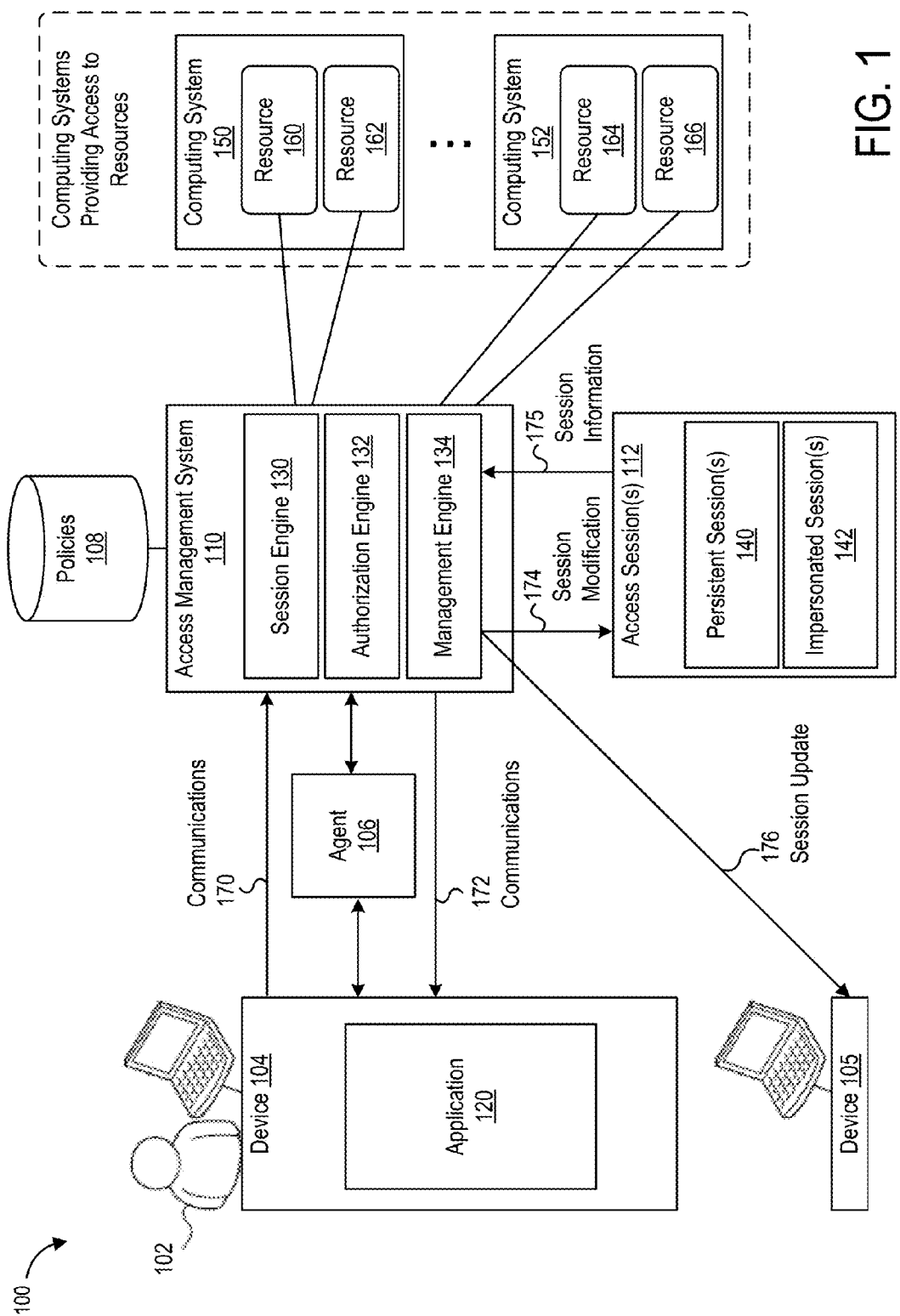
FIG. 1 illustrates a high-level diagram of a system for enabling management of sessions associated with the user, in accordance with an embodiment.

In the following description, for the purposes of explanation, specific details are set forth in order to provide a thorough understanding of embodiments of the present disclosure. However, it will be apparent that various embodiments may be practiced without these specific details. For example, circuits, systems, algorithms, structures, techniques, networks, processes, and other components may be shown as components in block diagram form in order not to obscure the embodiments in unnecessary detail. The figures and description are not intended to be restrictive.

The present disclosure relates generally to access management for sessions, such as a single sign-on (SSO) session. A session may provide a user with access to one or more systems after an initial authentication based on authentication of credential information (e.g., a username and a password). Access to a system may provide access to one or more resources. Resources may include any item managed and/or stored by a computing system, such as an application, a document, a file, electronic content, and/or the like. A resource may be identified by a uniform resource locator (URL) or other data indicating a source of the resource.

Certain techniques are disclosed for providing users of an access management system the capability to manage the user's active sessions (e.g., SSO sessions) by communicating with an exposed self-service session management interface at a device that is operated by the user. The interface may be exposed as a portal, such as a graphical interface in an application or a graphical web interface. The interface may be exposed as an application programming interface (API) to which an application can be configured to call. By using the interface, the user may view session attribute of each session, terminate sessions that are no longer needed or no longer easily accessible by the user (e.g., sessions established for a device that is lost or otherwise physically inaccessible), or modify one or more attributes (e.g., authentication level, persistence, expiration time, etc.) of a session to suit the needs of the user.

Because a single user may operated a plurality of devices at different times, the access management system may establish sessions for the user at a plurality of devices (e.g., devices having different Internet protocol (IP) addresses). Techniques described here may allow the user to manage those sessions from a single device without an administrator's assistance. This may be particularly advantageous if a user is unable to terminate an unwanted session because of difficulty in physically accessing the device for which the session was established. For example, the user may have lost the device, the device may have been stolen, the user may have traveled to a different geographic location after using the device, or the venue at which the device is located has closed for the day. By enabling the user to manage or terminate sessions in these cases, the described techniques may prevent unauthorized individuals from abusing those sessions.

The ability to remotely modify attributes of an active session without an administrator's assistance may be advantageous in organizations involving different resources are protected at different authentication levels. For example, a first user (e.g., a manager of the organization) can establish a session with a particular authentication level at a second user's device so that the second user may access sensitive resources protected by that authentication level for the active duration of the session. After the first user is no longer able to access second user's device (e.g., the first user traveled to another location), the first user may use the interface to lower the authentication level of that session so the second user no longer has access to the sensitive resources.

Some embodiments, such as systems, methods, and machine-readable media are disclosed for enabling a user to manage the user's sessions. FIG. 1 illustrates a system 100 where a user (e.g., user 102) has created one or more sessions at one or more clients and can initiate a process to manage the one or more sessions. One of the one or more clients may be a device or a client application (e.g., a web browser). In cases where the user leaves a session unattended and is unable to terminate the session in a conventional fashion (e.g., logout of the session) due an unexpected circumstance (e.g., lost device, geographic relocation, crashed application), the user may operate a device (e.g., device 104) to access an interface provided by an access management system (e.g., access management system 110) to terminate the session, thereby reducing the chance that the session is abused by an unauthorized individual. For purposes of illustration, "session" as described herein includes an SSO session; however, a session may include other types of sessions enabling access to a user. Access management system 110 may provide access one or more protected resources. Access management system 110 may implement a sign-on system, e.g., a SSO system, which can establish an SSO session to provide SSO access to the one or more resources.

Resources may include, without restriction, a file, a web page, a document, web content, a computing resource, or an application. For example, system 100 may include resources 160, 162, 164, and 166, which may be applications and/or content accessible through an application. A resource may be requested and accessed using an application. For example, an application (e.g., a web browser) may request access to a web page from a resource server based on a URL identifying a requested resource. Resources may be provided by one or more computing systems, e.g., computing systems 150 and 152, which may each be a resource server that provides access to one or more resources upon authentication of user 102 in a SSO system.

User 102 may operate a client device, e.g., device 104, that may present one or more interfaces for accepting input, which enables the user to interact with an access management system (e.g., access management system 110). Examples of interfaces may include graphical user interfaces (GUIs) described with reference to FIGS. 3-8. The interfaces may be provided by an application, e.g., application 120, executing on device 104. An interface may provide one or more interactive elements that the user can interact with to initiate the transmission of a request to modify a session. A request to modify a session may specify one or more operations for managing the user's sessions (e.g., retrieving information about the sessions, terminating an unwanted session, changing attributes of a session). Upon receiving a request to modify a session from user 102, access management system 110 may exchange a series of communications with device 104 to apply the operations specified by the request. In particular, the communications from access management system 110 to device 104 may include graphical interface data that enables the device to display, to user 102, graphical interfaces that include session information.

Access management system 110 may be implemented by a computing system. The computing system may include one or more computers and/or servers (e.g., one or more access manager servers), which may be general purpose computers, specialized server computers (including, by way of example, PC servers, UNIX servers, mid-range servers, mainframe computers, rack-mounted servers, etc.), server farms, server clusters, distributed servers, or any other appropriate arrangement and/or combination thereof. Access management system 110 may run any of operating systems or a variety of additional server applications and/or mid-tier applications, including HTTP servers, FTP servers, CGI servers, Java servers, database servers, and the like. Exemplary database servers include without limitation those commercially available from Oracle, Microsoft, and the like. Access management system 110 may be implemented using hardware, firmware, software, or combinations thereof.

In some embodiments, access management system 110 may be implemented by multiple computing devices (e.g., access manager servers) deployed as a cluster in a data center, which allows for scalability and high availability. Multiple such geographically dispersed data centers with access manager server clusters can be connected (wired or wirelessly) to constitute a multi-data center (MDC) system. An MDC system may satisfy high availability, load distribution, and disaster recovery requirements of access servers within an enterprise computer network. An MDC system may act as a single logical access server to support SSO services for access management system 110.

In some embodiments, access management system 110 may be a distributed system, such as distributed system 110, where the process of managing a user's sessions includes communicating with multiple computer systems that may be located in different geographic locations. The process of managing a user's sessions may involve synchronizing session information between the multiple computing systems.

Access management system 110 may include at least one memory, one or more processing units (or processor(s)), and storage. The processing unit(s) may be implemented as appropriate in hardware, computer-executable instructions, firmware, or combinations thereof.

In some embodiments, access management system 110 may include several subsystems and/or modules. For example, access management system 110 may include session engine 130, authorization engine 132, management engine 134, each of which may be implemented in hardware, software (e.g., program code, instructions executable by a processor) executing on hardware, or combinations thereof. In some embodiments, the software may be stored in a memory (e.g., a non-transitory computer-readable medium), on a memory device, or some other physical memory and may be executed by one or more processing units (e.g., one or more processors, one or more processor cores, one or more GPUs, etc.). Computer-executable instructions or firmware implementations of the processing unit(s) may include computer-executable or machine-executable instructions written in any suitable programming language to perform the various operations, functions, methods, and/or processes described herein. The memory may store program instructions that are loadable and executable on the processing unit(s), as well as data generated during the execution of these programs. The memory may be volatile (such as random access memory (RAM)) and/or non-volatile (such as read-only memory (ROM), flash memory, etc.). The memory may be implemented using any type of persistent storage device, such as computer-readable storage media. In some embodiments, computer-readable storage media may be configured to protect a computer from an electronic communication containing malicious code. The computer-readable storage media may include instructions stored thereon, that when executed on a processor, perform the operations described herein.

FIG. 1 illustrates a high-level diagram of a system for enabling a user to manage active sessions of the user, in accordance with an embodiment. In this example, user 102 may operate device 104 to manage one or more sessions that were previously established for the user. Each of the one or more sessions may have been established so that user 102, while operating a device (e.g., devices 104-105), may access resources 160, 162, 164, and 166, which are each hosted by one of computing systems 150 and 152. To establish one of these sessions, for a particular device, user 102 may be authenticated by access management system 110. Device 104 may initiate an authentication process by requesting access from access management system 110. The authentication process may be performed using an authentication mechanism involving one or more authentication steps, including (1) device 104 receiving credential information of user 102 and submitting the credential information to access management system 110 and (2) access management system 110 verifying the credential information.

In some embodiments, a different user other than user 102 may have established one or more sessions on device 105. In such embodiments, user 102 may be operating device 104 to manage the sessions of the other user via access management system 110.

User 102 may operate an application (e.g., application 120) that provides the user a client-side interface to interact with access management system 110. In some embodiments, application 120 may be access management application that displays, to the user, one or more graphical interfaces, such as those depicted in FIGS. 3-8. Using application 120, user 102 may initiate a management process to view and modify one or more of the user's sessions. The management process may include one or more communications 170 (e.g., request to modify a session s) from device 104 to access management system 110. The management process may include one or more communications 172 (e.g., session management responses) from access management system 110 to one or more devices (e.g., devices 104-105) operated by user 102. Some embodiments of the process are described further below.

Communications between device 104 and access management system 110 can be received through a gateway system. The gateway system may support access management services. For example, a single sign-on (SSO) gateway may implement one or more access agents, such as agent 106 (e.g., web gate agent), to balance and/or handle requests from clients and access management system 110.

In at least one embodiments, a management process may be initiated by user 102 interacting with an interactive element (e.g., clicking a link that contains a URL to the interface) displayed by application 120. In some embodiments, an authentication process may be initiated. If user 102 does not have an active session on device 104 (e.g., the session is expired or doesn't exist), the access management system 110 may request credential information from user 102 before allowing the user to continue the management process. This credential information request may cause application 120 to display, to the user, a GUI (e.g., a login screen) that enables user 102 to provide credential data. Upon the provision of credentials by user 102, a communication that comprises the credentials may be sent from device 104 to access management system 110 to initiate the creation of a session for user 102 at device 104. Specifically, session engine 130 may validate the credential data to determine an authentication of user 102. If the authentication succeeds, session engine 130 may establish a session for user 102. In particular, the establishment of the session may include managing (e.g., create, read, update, and delete) a representation of the session in a data store, e.g., access sessions 112.

Upon user 102 interacting with the interactive element displayed by application 120, a request to modify a session may be sent by device 104 to access management system 110. Upon receiving the request, management engine 134 may manage the session management process. Management engine 134 may retrieve session information about the user's sessions, e.g., session information 175, from access sessions 112. In some embodiments, management engine 134 may communicate with session engine 130 to obtain session information from access sessions 112.

Upon retrieving the session information, management engine 134 may send a session management response to device 104. The response may cause application 120 to display a graphical interface that includes the session information. In at least one embodiment, the graphical interface may list each of the user's sessions with the session's attributes. The attributes for of a session may include the session's authentication level, persistence state, impersonation state, time of creation, Internet protocol (IP) address, and geographic area.

The graphical interface may include various interactive elements (e.g., buttons, drop down lists, and links) that can be interacted with by user 102 to specify a session modification that will be communicated by application 120 to access management system 110. Upon receiving input from user 102, application 120 may cause device 104 to transmit a request to modify a session to access management system 110.

Upon receiving the request, management engine 134 may apply the modification specified by the request, e.g., session modification 174, to the back-end representation of a session the data store, e.g., access sessions 112. In some embodiments, management engine 134 may modify a client-side representation of the session stored on device 105 by sending a request, e.g., session update 176 (i.e., a client-side update) to device 105. After the modification is applied, management engine 134 may send, to device 104, a session management response comprising modified session information. The receipt of the response may cause application 120 to display another graphical interface that includes the modified session information, such as the modified attributes of the modified session.

Resources (e.g., resources 160, 162, 164, and 166) may be accessible to user 102 based on successful authentication of credential information. Upon receiving the credential information, session engine 130 may verify whether a requested resource, e.g., resource 160, is a protected resource. Session engine 130 may request authorization engine 132 to determine whether access to a resource is protected. Upon determining that access determines that the resource is not protected, session engine 130 may grant access to a resource. Upon determining that access to a resource is protected, session engine 130 may determine authentication of user 102 based on the credential information. Upon determining authentication of user 102, authorization engine 132 may determine whether user 102 is authorized to access a resource based on access permitted to user 102. Session engine 130 may send a communication to device 104 to indicate whether access to a resource is permitted by user 102. Resource 160 may be made available to user 102 based on whether access is permitted.

Access management system 110 may provide many SSO services including management of access (e.g., granting/denying access) to resources, automatic sign-on, application password change and reset, session management, application credential provisioning, as well as authentication of a session. In some embodiments, access management system 110 can provide automatic single sign-on functionality for applications, such as Windows® applications, Web application, Java® applications, and mainframe/terminal-based applications running or being accessed from devices. As explained above, access management system 110 may perform authentication of a user (e.g., user 102) operating a device (e.g., device 104). Authentication is a process by which a user verified to determine that he/she is who he/she claims to be.

In some embodiments, access management system 110 may use one or more policies stored in a data store (e.g., policies 108) to control access to resources. Policies 108 may include an authentication policy that specifies the authentication methodology to be used for authenticating the user for whom the access must be provided on a given resource. Policies 108 define the way in which the resource access is to be protected (e.g., type of encryption, or the like). Policies 108 may include an authorization policy that specifies the conditions under which a user or group of users has access to a resource. For example, an administrator may only authorize certain users within a group to access particular resources. Access management system 110 may determine authentication for an SSO session based on one or more of policies 108.

Access management system 110 may also include or be coupled to additional storage, which may be implemented using any type of persistent storage device, such as a memory storage device or other non-transitory computer-readable storage medium. In some embodiments, local storage may include or implement one or more databases (e.g., a document database, a relational database, or other type of database), one or more file stores, one or more file systems, or combinations thereof. The memory and the additional storage are all examples of computer-readable storage media. For example, computer-readable storage media may include volatile or non-volatile, removable or non-removable media implemented in any method or technology for storage of information such as computer-readable instructions, data structures, program modules, or other data.

Session engine 130 may handle processing to determine whether a valid session exists for user 102 to access a resource. Session engine 130 checks for a valid session for user 102 to access a requested resource that is protected. Session engine 130 may assess validity of a session for user 102 based on consideration of one or more access policies applicable to user 102. Based on determining that a valid session does not exist for user 102, session engine 130 may request credential information ("credentials") from user 102.

Successful authentication of the credential information may provide the user with access to one or more resources, which may include a requested resource.

A request may be communicated to device 104, which in response, prompts user 102 for user credentials to determine authentication of a session. The request may include information (e.g., a URL) to a user interface (e.g., a web page, portal, or dashboard) to receive credential information. The request may be communicated to device 104, which in response prompts user 102 for user credentials to determine authentication of a session.

Session engine 130 may perform operations to authenticate credential information for user 102. In some embodiments, session engine 130 may store information about sessions established upon successful authentication of a user. For a SSO session (e.g., SSO authenticated sessions), the SSO session may be managed as a SSO session enabling access to all resources accessible to user based upon successful authentication of credential information for a user.

In some embodiments, session engine 130 may communicate with authorization engine 132 regarding the scope of authentication. Authorization engine 132 can determine resources that are protected and based on access sessions 112, can determine resources that are permitted and/or restricted for a session.

For purposes of illustration, "session" as described herein includes an SSO session; however, a session may include other types of sessions enabling access to a user. Access management system 110 may provide access to one or more resources. Access management system 110 may implement a sign-on system, e.g., an SSO system, which can establish an SSO session to provide SSO access to one or more resources.

A persistent session may be a session that is persisted beyond the immediate scope of use for which the session was established (i.e., a "remember me" session). Sessions created by a user at an application (e.g., a web browser) may be terminated after the user exits the application. Rather than have the user participate in an authentication process (e.g., provide credentials) each time the user wishes to access protected resources, access management system 110 may allow the user to establish a persistent session that stays active for a longer period of time (e.g., indefinitely). The persistent session may be preserved after regardless of events that would cause a non-persistent session to be terminated (e.g., exiting the application, turning off the device). An impersonated session may a be session that enables a user ("impersonator") to access a resource on behalf of an impersonatee. Different users of access management system 110 may be authorized to access different subsets of protected resources. In an example organization, sensitive resources may be available only to a particular user of the access management system, such as a first user (e.g., a manager). A second user (e.g., a lower-ranking employee) may not be authorized to access the sensitive resources. In a situation where the first user needs to provide the second user with temporary access to the sensitive resources (e.g., such as when the manager goes on vacation), the first and second users may invoke an impersonation process that gives rise to an impersonation session, where the second user impersonates the first user at access management system 110 to gain access to the sensitive resources. More information on impersonated sessions can be found in U.S. Non-Provisional application Ser. No. 15/291,804, filed Oct. 12, 2016, entitled "Run-Time Trust Management System for Access Impersonation," the entire contents of which are incorporated herein by reference for all purposes.

Sessions 112 may store representations for all sessions for one or more users of the access management system 110. In particular, access sessions 112 may comprise one or more active sessions of user 102. Some of these active sessions may have been previously established by the user at a device. In some embodiments, access sessions 112 may be managed by session engine 130. In some embodiments, access sessions 112 may be a data store that is implemented by a database or a data structure in memory.

Access sessions 112 may comprise persistent sessions 140, which comprises representations for one or more persistent sessions. In some embodiments, the graphical interface that is used by the user to provide credential data may also include an interactive element that can be interacted with to specify that the session will be a persistent session.

Access sessions 112 may comprise impersonated sessions 142, which comprises representations for one or more impersonated sessions.

In some embodiments, access management system 110 may be implemented in system 100 according to an agent-server model for communication between device 104 and any one of access manager servers implemented for access management system 110. The agent-server model may include an agent component (e.g., a gateway system) and a server compontent. The agent component may be deployed on a host system and the server component may be deployed on a server, e.g., an access manager server. User 102 operating device 104 may communicate with access management system 110 via agent 106 using an enterprise computer network. Device 104 may be a workstation, personal computer (PC), laptop computer, smart phone, wearable computer, or other networked electronic device.

Management engine 134 may expose a service that enables user 102 to manage the user's sessions. In some embodiments, management engine 134 may implement the interface (e.g., a portal, an API, or a dashboard). Management engine 134 may respond to a request from device 104 for session information about the user's sessions by retrieving the session information from the data store (e.g., access sessions 112) and sending the session information to the device in a response. To retrieve the session information, management engine 134 may communicate with session engine 130. Management engine 134 may include, in the response containing the session information, graphical interface information (e.g., Hypertext Markup Language (HTML) code) that may cause application 120 to display a graphical interface to user 102.

Management engine 134 may receive requests from device 104 to modify one or more of the user's sessions. Upon receiving a request that specifies a modification to a particular session of the user, management engine 134 may modify the representation of the specified session located in the data store in accordance with the request. Management engine 134 may then retrieve modified session information from data store and send the modified session information in a response to device 104, thereby causing application 120 to display a graphical interface that includes an indication that the requested modification was applied. In some embodiments, management engine 134 may communicate with session engine 130 to read from and write to the data store.

In some embodiments, to prevent unauthorized individuals from managing a user's sessions, the interface may be a protected resource. In such embodiments, upon receiving a request to modify a session from device 104, session engine 130 may intitiate an authorization process. Because potential damage from allowing unauthorized management of a user's sessions may be severe, session engine 130 may employ a stepped-up authentication mechanism for requests to access the interface. In particular, a stepped-up authentication mechanism may include one or more additional authentication steps on top of the one or more authentication steps comprised by the authentication mechanism used to authenticate a request to other protected resources (e.g., resources 160, 162, 164, and 166). If the authentication succeeds, access management system 110 may forward the request to modify the session to management engine 134.

Agent 106 may provide access control and may operate to protect access management system 110 and any resources accessible through access management system 110 against external and internal web-based threats. Access management system 110 may communicate with one or more resource computing systems (e.g., resource servers) that provide access to one or more resources, e.g., resources 160, 162, 164, and 166. Agent 106 may implement or operate as the agent component for access management system 110 and may include a server that operates as the server component. Each resource accessible by access management system 110 may be protected through an agent, e.g., agent 106. Agent 106 may intercept user requests for one or more resources protected by it and check for user credentials in order to authenticate the user. The agent may then contact a server, e.g., an access manager server at access management system 110. The access management server may verify whether a resource is a protected resource. If the access management server determines that the resource is not protected, agent 106 may grant access to user 102. If the resource is protected, agent 106 may request user 102 to provide authentication credentials.

In some embodiments, communication between agent 106 and access management system 110 may be split into two different channels of communication. For example, communication via a front-channel may use a hypertext transfer protocol secure (HTTPS) protocol. Front-channel communications may include less frequent communications, such as communications for credential collection operations for authentication. Communication via a back-channel may use an open access protocol (OAP). Back-channel communications may include more frequent communications, such as agent-server interactions including requests for access to a resource managed by access management system 110. Each channel may communicate using an access token designed for the type of communication over the channel. The access flow may generate two types of browser tokens. A first token is an access management ID token (e.g., OAM ID token), which serves the SSO requests that are being propagated over HTTP. A second token is an authorization token (e.g., OAMAuthn Token) that may be used to serve the SSO requests that are being propagated over OAP. The browser tokens may be stored as host cookies at device 104.

Access management system 110 (e.g., using agent 106) may present user 102 with a request for authentication credentials in the form of a challenge (e.g., via the user's web browser at device 104). In some embodiments, user 102 can access SSO user interface through a client executing on device 104 or through a web browser on device 104. The SSO user interface may be implemented at access management system 110. Access management system 110 may send, with the request, the SSO user interface or information (e.g., a URL) enabling access to the SSO user interface.

In some embodiments, an SSO user interface can include a list of the applications user 102 commonly utilizes. User 102 can manage their credentials and policies associated with applications through the SSO user interface. When user 102 requests to access an application through the SSO user interface, a request may be sent from device 104 to access management system 110 to determine a policy type for the application from one or more policies 108 applicable to user 102. Access management system 110 may determine whether a valid session exists for the user and if so, then it can determine user's 102 credential information based on the policy type.

In some embodiments, the request may include an authentication cookie from a previous login that can be used to determine whether user 102 is authorized to retrieve the credential. If authorized, the user can be logged into the application using the credential. In some embodiments, agent 106 can enable users to access applications 120 using SSO services provided by access management system. Access may be provided through a web browser directly, without first accessing the SSO user interface or using a client executing on device 104. If user 102 is not authorized, then access management system may request credentials from user 102. The SSO user interface may present an interface to receive input including credential information. The credential information may be sent 110 to access management system 110 to determine authentication of user 102.

In some embodiments, credential types can be supported, such as Oracle Access Management protected resources, federated applications/resources, and form-fill applications. Examples of credential types may include a Smartcard/Proximity card, a token, a public key infrastructure (PKI), a Windows Logon, a lightweight directory access protocol (LDAP) logon, a biometric input, or the like. For OAM protected resources, user requests can be authenticated and then directed to URLs associated with the requested resources. For Federated Applications, links to federated partners and resources can be provided, including business to business (B2B) partner applications and SaaS applications. For form fill applications, templates can be used to identify fields of application web pages through which credentials can be submitted.

In some embodiments, the SSO user interface that receives input for providing authentication credentials may include one or more interfaces for enabling self-service session management by the user. Examples of interfaces may include those described with reference to FIGS. 3-8.

In some embodiments, such as those described with reference to FIGS. 2-10, may be described as a process which is depicted as a flowchart, a flow diagram, a data flow diagram, a structure diagram, a sequence diagram, or a block diagram. Although a sequence diagram or a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The processes depicted herein, such as those described with reference to FIGS. 2-10, may be implemented in software (e.g., code, instructions, program) executed by one or more processing units (e.g., processors cores), hardware, or combinations thereof. The software may be stored in a memory (e.g., on a memory device, on a non-transitory computer-readable storage medium). In some embodiments, the processes depicted in flowcharts herein can be implemented by a computing system of an access management system, e.g., access management system 110 of FIG. 1, device 104, any of the elements in FIG. 1, or combinations thereof. The particular series of processing steps in this disclosure are not intended to be limiting. Other sequences of steps may also be performed according to alternative embodiments. For example, alternative embodiments of the present disclosure may perform the steps outlined above in a different order. Moreover, the individual steps illustrated in the figures may include multiple sub-steps that may be performed in various sequences as appropriate to the individual step. While processing depicted in FIGS. 2-10 may be described with respect to accessing a single resource, such processing may be performed for multiple resources, such that validation of a computing system of an access management system can be requested each time a resource is accessed and/or authentication of a user needs to be determined for access to a resource. Processing depicted in FIGS. 2-10 may be described with respect to multiple sessions, each for which validation of a computing system of an access management system may be requested. Furthermore, additional steps may be added or removed depending on the particular applications. One of ordinary skill in the art would recognize many variations, modifications, and alternatives.

In an aspect of some embodiments, each process in FIGS. 2-10 can be performed by one or more processing units. A processing unit may include one or more processors, including single core or multicore processors, one or more cores of processors, or combinations thereof. In some embodiments, a processing unit can include one or more special purpose co-processors such as graphics processors, digital signal processors (DSPs), or the like. In some embodiments, some or all of processing units can be implemented using customized circuits, such as application specific integrated circuits (ASICs), or field programmable gate arrays (FPGAs).

Figure 2:
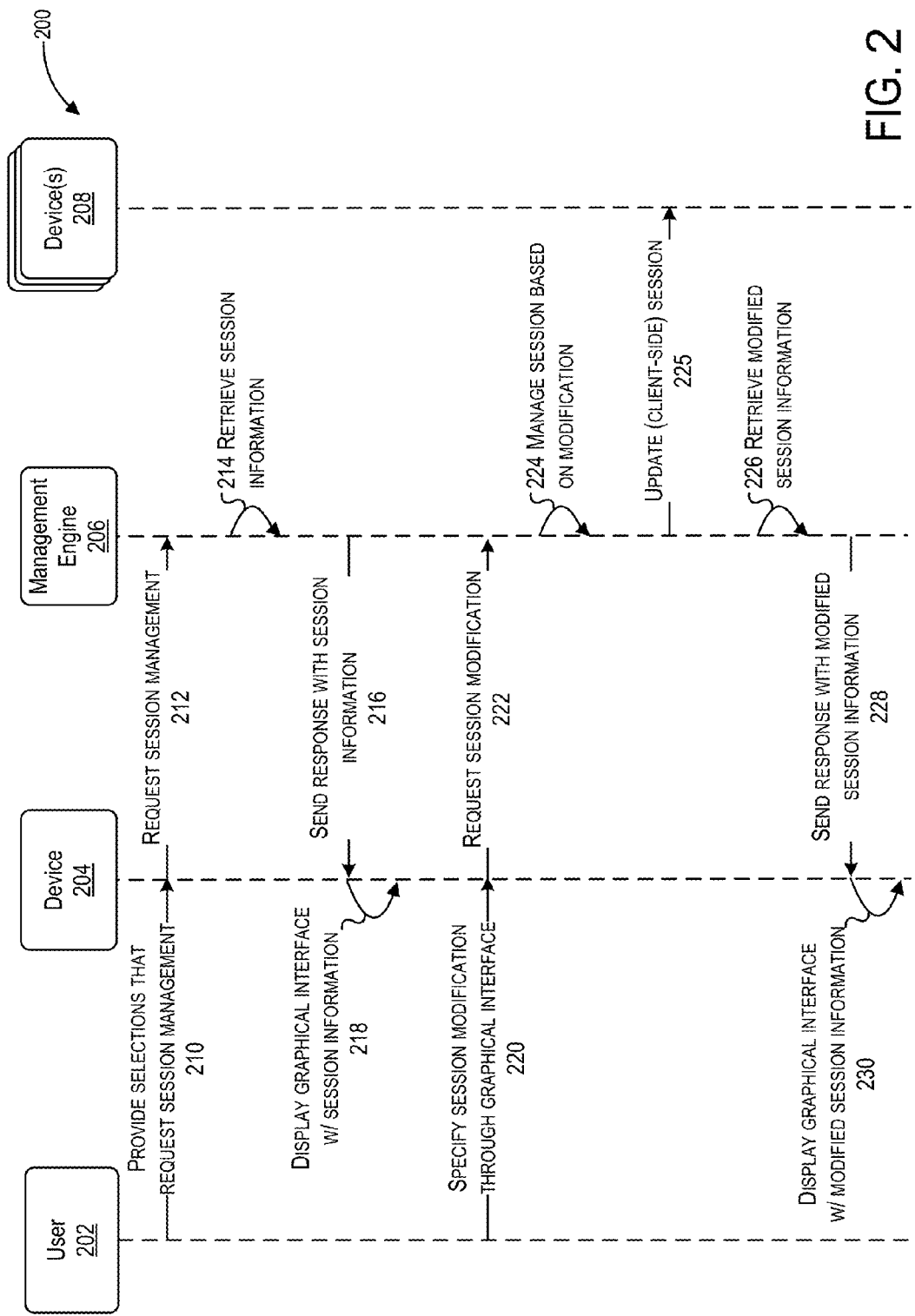
FIG. 2 illustrates a sequence diagram showing operations for enabling management sessions associated with the user, in accordance with an embodiment.

FIG. 2 illustrates a sequence diagram showing operations for enabling a user to manage the user's sessions at an access management system (e.g., access management system 110) in accordance with an embodiment. FIG. 2 shows a sequence diagram 200 for enabling a user to manage one or more sessions associated with the user, the one or more sessions residing on the device currently operated by the user or one or more other devices previously operated by the user.

Starting at step 210, user 202 operates device 204 to make sessions management requests. For instance, user 202 may have established a session that the user can no longer access or attend to and the user may wish to terminate the session to prevent an unauthorized individual from using the unattended session to gain access to resources (e.g., resources 160, 162, 164, and 166) protected by an access management system (e.g., access management system 110). For example, user 202 may have established the session at a different device that the user can no longer physically access, such as device 208 (which may refer to one or more devices). In another example, an application previously used by user 202 (e.g., a web browser, an access management application, etc.) for which a session was created may have crashed, which prevents the user from terminating the session (e.g., logging out of the session). To initiate the session management process, user 202 may provide input to device 204. For example, user 202 may click on a link that leads to an interface (e.g., a portal).

At step 212, device 204 sends a request to modify a session to management engine 206 of the access management system. To retrieve information about the user's sessions, the application may submit a request to modify a session to the access management system. Management engine 206 may be implemented on a server computer (e.g., access management server computer) of the access management system. For example, management engine 206 may include or implement management engine 134 of FIG. 1. To enable management engine 206 to retrieve the sessions of user 202, the request may identify user 202. In embodiments where the application is a browser, the request to modify the session may be an HTTP request. In embodiments where the access management system is implemented according to an agent-server model, an agent component (e.g., agent 106) may intercept the the request for the interface. As explained above, because the interface is a protected resource, the agent component may check the request for user credentials in order to authenticate the user 202.

If user 202 is not authenticated, a session engine of the access management system may initiate a stepped-up authentication process that may comprise one or more additional authentication steps in comparison to an authentication process that is not stepped up, which may be dictated by a policy from, e.g., policies 108 of FIG. 1. For example, the session engine may include or implement session engine 130 of FIG. 1. A session engine may be configured to manage access to resources and to handle authentication of devices to establish sessions. A session engine may be implemented on a server (e.g., authentication server) of the access management system.

As explained above, a resource may be an application or a resource accessible using an application. A device may be operated to request access to resources through an application. To obtain access, the user can provide access credentials via the application to the access management system for authentication of the user. A session engine may establish a session (e.g., a SSO session) upon successful authentication of the user. A session may enable a user to access one or more resources from the device.

In some embodiments, a request to access a resource may be handled by an agent, such as a web gate. For example, the session engine may include or implement agent 106 of FIG. 1. An agent may protect access to a resource provided by a server. A device may communicate with an access management system by communicating, directly or indirectly via an agent, with a session engine. An agent may intercept user requests for one or more resources protected by it to determine access to a requested resource. An agent may check for user credentials in order to authenticate a user for a session to access to resources controlled by a access management system. An agent may determine whether a resource is protected and if so, whether an active session exists to enable access to the resource from a device.

A session engine may handle authentication of a device to establish a session. Upon receiving a request to access a resource, the session engine may determine whether access to the resource is protected. Access to a resource may be based on authentication of the user. The session engine may determine whether a valid session is active for the user. The existence of a valid session may indicate that the user has been authenticated. The session engine may determine whether the active session enables access to a resource such as the requested resource. In some embodiments, authentication may be specific to certain resources. In some embodiments, the session engine may assess the validity of a session for a user based on consideration of one or more access policies applicable to the user.

In the example of FIG. 2, the session engine may determine that user 202 is not authenticated to access the interface. The session engine may determine that the user is not authenticated by determining that a valid session does not exist for user 202 at device 204. Upon determining that the user is not authenticated to access the interface, the session engine may send a request to device 204 for user credential information ("request for user credentials"). Device 204 receives the request for credential information. In some embodiments, the request for credential information may be received via the application executing on device 204. It should be noted that because the interface can be considered an especially sensitive resource, the session engine may request stepped up user credentials from user 202.

In response to a request for user credentials, device 204 may provide an interface that enables the device to receive credential information. The interface may be provided in an application, e.g., application 120. The interface may include one or more interactive elements to enable a user to provide credential information (e.g., text input fields for receiving a user name and a password). Once the user submits the credential information, device 204 may send the credential information to the session engine for verification.

The session engine may verify the credential information for the user. Verifying the credential information may include determining whether the credential information matches previously established credential information associated with the user identification information of the user. Access to the requested resource at step 212 may be granted based on verifying that the credential information is correct. The session engine may grant access by storing information that indicates access is granted. The session engine may send data to device 204 indicating information about access that is granted. In some embodiments, data about access that is granted may be sent to the application (e.g., a cookie). The application may enable access to the resource (e.g., application 120) based on receiving data from the session engine indicating that access has been granted. Upon a successful authentication of user 202, management engine 206 may receive the request to modify the session.

At step 214, management engine 206 retrieves session information about sessions of user 202. Upon receipt of the request to modify the session, management engine 206 may identify user 202 from the request. Management engine 206 may use the user's identity to retrieve the sessions that are still currently active for the user from the data store. Some the user's sessions may be sessions that grant device 204 access to resources protected by the access management system. Some the user's sessions may be sessions that grant one or more other devices (e.g., device 208) access to the resources. Some of the sessions may be persistent sessions. Some of the sessions may be impersonation sessions.

Management engine 206 may communicate with the session engine to retrieve the session information. In embodiments where active sessions of the access management system are stored in a data store (e.g., one or more database tables, one or more data structure in memory), management engine 206 may not be able to directly access the data store. Instead, management engine 206 may translate the request to modify the session into one or more calls to the session engine. In response to receiving the one or more calls, the session engine may access the data store to retrieve the session information and return the session information to management engine 206.

The retrieved session information may comprise a number of attributes for each of active sessions associated with the user. The attributes that may include an identifier of the user, the session's identifier, the session's authentication level (which may be a number such as '2', '3', '4', etc.), a flag indicating whether the session is persistent (e.g., a boolean), a flag indicating whether the session is an impersonation session (e.g., a boolean), a timestamp of when the session was established, a timestamp of when the session was last accessed, a timestamp of when the session was last updated (i.e., refreshed), a timestamp of when the session will expire, and an IP address of the device for which the session was established.

At step 216, management engine 206 sends a response to device 204 that comprises the session information. In some embodiments, management engine 206 may include, in the response, graphical interface information. Upon receiving the graphical information, device 204 may display a graphical interface with the session information. For example, the response may include HTML code.

At step 218, device 204 displays, to user 202, a graphical interface that includes the session information. The interface may be displayed by the application executing on the device. An example of the interface is described below with reference to FIG. 4. The interface may include one or more elements (which may be graphical and/or interactive) that display the session information to user 202. In particular, the graphical interface may display the session attributes in a tabular format (i.e., a session management table), where each active session is represented by a row and each column of the table corresponds to an attribute. For example, if the user has established three sessions, the session management table may display three rows, where each row displays the session along with a IP address of the device on which the session was established. If the sessions are established for the same device, the three rows may display the same IP address. If the sessions are each established at a different device, the three rows may each display a different IP address.

At step 220, user 202 provides input to device 204 that specifies a modification to a session of the user using a graphical interface of the device. User 202 may provide input via interactive elements of the interface (e.g., portal) exposed by the access management system. Examples of the portal being used to modify active sessions are described below with reference to FIGS. 3-8. It should be noted that one of the advantages provided by some embodiments is the numerous ways the interface allows a user to modify a session. User 202 may modify a number of session attribute for each of the user's sessions, as described below.

The interface may enable user 202 to terminate one or more of the user's sessions. For example, user 202 may have established a session at an application that has crashed or at another device that is no longer accessible to the user. By using the interface to terminate these sessions, user 202 may prevent unauthorized individuals from abusing these sessions. In some embodiments, the interface may enable user 202 to terminate all of the user's sessions with a single input (e.g., one click of a button). Additionally, the interface may enable user 202 to terminate all sessions of a particular type (e.g., all impersonation sessions).

The interface may enable user 202 to change an authentication level of an active session. In particular, the access management system may assign different resources different levels of protection. For example, a less sensitive resource may be protected at a lower authentication level while a more sensitive resource may be protected at a higher authentication level. Thus, to access a resource that is protected at a particular authentication level, a user would need to establish a session that has an authentication level that is equal to or higher than the resource's authentication level. In an example organization, user 202 may be able to establish a session that has a higher authentication level than that of a second user. In situations where user 202 establishes a session on behalf of a second user, user 202 may later need to modify that session's authentication level for security purposes. For example, the second user may be unable to create a session with a particular authentication level but may need temporary access to sensitive resources protected at that authentication level. Thus, user 202 may create a session on the second user's device (e.g., logging in at the second user's device) so that the second user can access those resources under the credentials of user 202. However, after user 202 leaves the vicinity where second user's device is located, user 202, for security reasons, may wish to revoke the second user's access to the sensitive resources. Because terminating the session at the interface may be disruptive to the second user, user 202 may instead lower the session's authentication level at the interface, thereby revoking the second user's access to the sensitive resources while preserving the second user's session. In another example, user 202 may raise an active session's authentication level at the interface, which enables the session to provide access to resources protected at the higher authentication level to user 202 or another user.

The interface may enable user 202 to toggle the persistence of an active session. For example, user 202 may have established a persistent session at a second user's device to enable the second user to access resources that are available to user 202 but not available to the second user. Later, user 202 may decide that the session should not be persistent. Thus, the interface may enable user 202 to change the persistent session to a non-persistent session, thereby making the second user's access to the resources temporary without terminating the session being used by the second user.

To preserve session-specific data (e.g., an email draft) that would otherwise be lost if a particular non-persistent active session were to expire, it may be beneficial to change the non-persistent session to a persistent one. Thus, the interface may enable user 202 to change the non-persistent session to a persistent session, thereby ensuring that the session-specific data won't be lost due to session expiration.

The interface may enable user 202 to hasten or delay the expiration time of an active session. As mentioned in a preceding example, user 202 may wish to delay the time at which a particular active session expires to preserve session-specific data. Here, the interface may enable user 202 to delay the expiration of the active session for hours, days, or weeks to ensure that the session-specific data is preserved for the specified period of time.

At step 222, device 204 sends a request to modify the the session to management engine 206. By sending a request to management engine 206, device 204 may cause management engine 206 to apply the session modification, which were specified by the user's input received in step 220, to the session back-end (e.g., access sessions 112). In embodiments where the application is a browser, the request to modify the session may be an HTTP request that encapsulates the specified session changes.

At step 224, management engine 206 manages the sessions of user 202 based on the modification specified by the request via session engine 130. Upon receipt of the request to modify the session, management engine 206 may identify, from the request, the user making the request and extract the specified session modification from the request. Management engine 206 may modify the attributes stored in the back-end representation of the specified session in accordance with the modification. If the device (e.g., device 208) contains a client-side representation of the specified session (e.g., a cookie or a client-side token), the client-side representation may be updated to be in agreement with the back-end representation the next time the device is able to communicate with the management engine.

For example, if the modification corresponds to terminating the specified session, the deletion of the back-end representation of the session may prevent the device (e.g., device 208) from accessing protected resources, irrespective of the device's client-side representation of the session. In another example, if the modification corresponds to lowering the authentication level of the specified session, the change of the authentication level in the session's back-end representation may prevent the device (e.g., device 208) from accessing protected resources protected at the former authentication level.

Management engine 206 may communicate with the session engine to apply the modification to the user's session. In particular, for each attribute change comprised by the session modification, management engine 206 may generate a call to the session engine that applies the change to the session's back-end representation at the data store. For each call, the session engine may write to the session's back-end representation.

At optional step 225, in embodiments where establishing a session for a device (e.g., device 204 or another device) comprises writing a token, a cookie, or some other client-side representation of the session to the device, the access management system may modify the client-side representation. This step may involve the access management system sending one or more communications (e.g., requests) to the device to modify the client-side representation. In some embodiments, the access management system may send a new token, a new cookie, or new data to the device to store, where the new token, the new cookie, or the new data represents the modified session. For example, when a session is terminated, the access management system may send a communication to the device, which may causes the device to delete the client-side representation. In some embodiments, this step may involve updating sessions in multiple devices that are associated with user 202.

At step 226, management engine 206 may retrieve modified session information about the modified sessions of user 202. Management engine 206 may make a call to the session engine to retrieve the modified session information. Upon receiving the call, the session engine may access the data store to retrieve the modified session information. The changes made in step 220 may be reflected within the modified session information.

At step 228, management engine 206 sends a response to device 204 that comprises modified session information. Management engine 206 may include graphical interface information in the response, which may cause device 204 to display a graphical interface with the modified session information.

At step 230, device 204 displays a graphical interface with the modified session information to user 202. While the second graphical interface may be visually and functionally similar to the graphical interface displayed in step 218, the second graphical interface may reflect changes specified by user 202 in step 220. For example, if sessions are displayed as rows in a table, a deletion of a session may be reflected by the table having lost a row while a change to a session attribute may be reflected by a changed value in the table cell that corresponds to the session attribute.

Hence, by operating device 204 to send requests to modify a session to management engine 206, user 202 can manage, from device 204, sessions that the user established on one or more devices without the assistance of an administrator.

FIGS. 3-8 illustrate interfaces (e.g., GUIs) for enabling a user to manage the user's sessions in accordance with an embodiment. Each of the GUIs in FIGS. 3-8 may be displayed in an application, e.g., application 120 of FIG. 1. Each of the GUIs in FIGS. 3-8 may be displayed by an access management application that manages access to one or more resources. Each of the GUIs in FIGS. 3-8 may be generated by a device, may be received from an access management system that generates the GUI, or a combination thereof. Each of the GUIs in FIGS. 3-8 may be provided by an access management system via a network as part of a service (e.g., a cloud service) or a network-accessible application. In at least one example, a user of an access management system may operate a device to interact with each of the GUIs in FIGS. 3-8.

Figure 3:
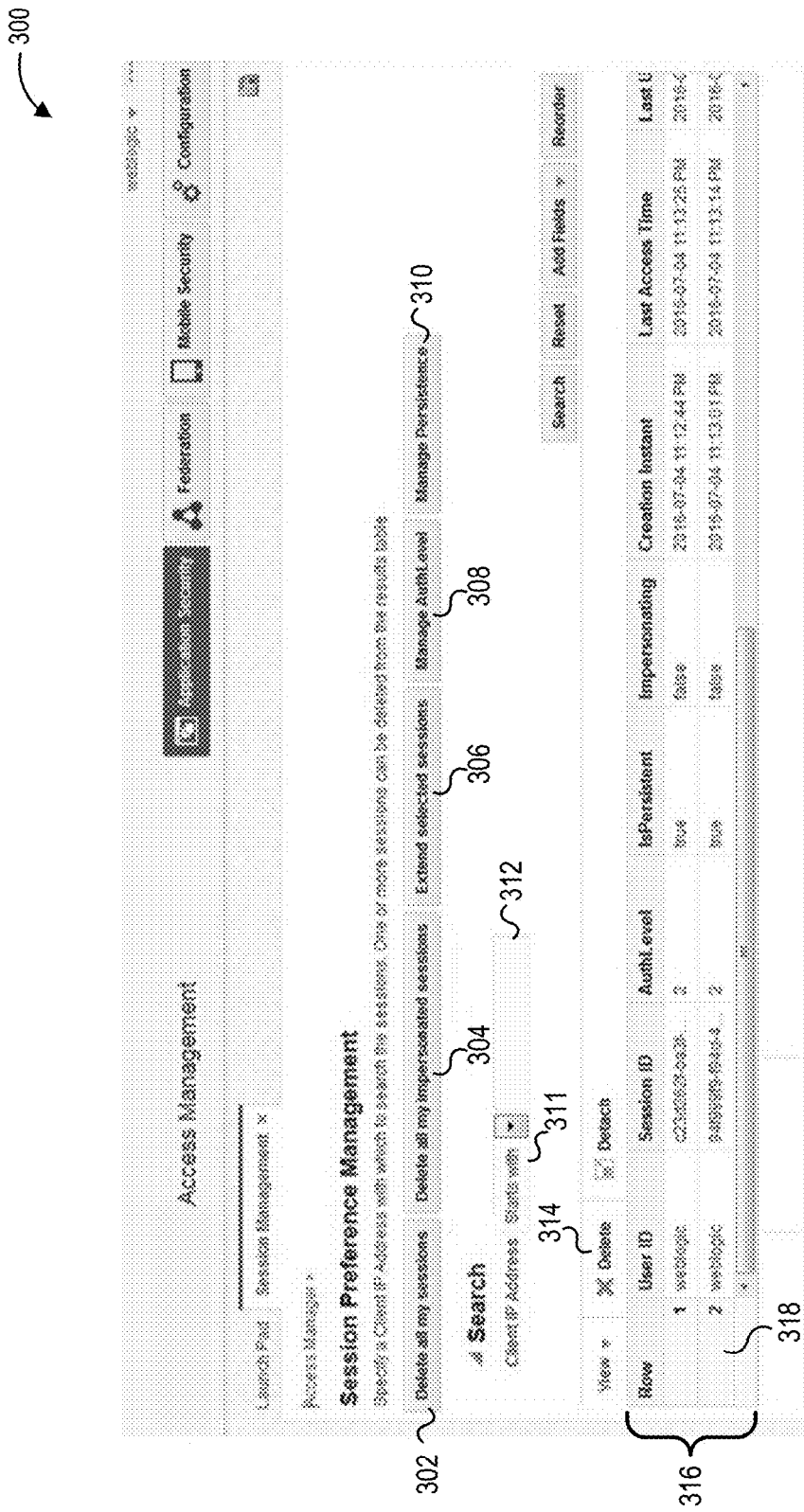
FIGS. 3-8 illustrate graphical user interfaces (GUIs) of a process for enabling a user to manage sessions associated with the user, in accordance with an embodiment.

Now turning to FIG. 3, a GUI 300 is depicted that enables a user to view session information about the user's active sessions and modify attributes of the sessions in accordance with an embodiment. GUI 300 may include one or more interactive elements that a user may interact with to specify changes to attributes of sessions. For example, GUI 300 may include an interactive element that displays session information of the user's active sessions. As shown in FIG. 3, in some embodiments, the session information may be displayed by a table 316 having one or more rows (e.g, row 318) and one or more columns, where each row corresponds to an active session of the user, each column corresponds to a type of session attribute, and each cell corresponds to a session attribute of a particular active session. The session attributes displayed by table 316 may include, for each active session, an identifier of the user, the session's identifier, the session's authentication level (which may be a number such as '2', '3', '4', etc.), a flag indicating whether the session is persistent (e.g., a boolean), a flag indicating whether the session is an impersonation session (e.g., a boolean), a timestamp of when the session was established, a timestamp of when the session was last accessed, a timestamp of when the session was last updated (i.e., refreshed), a timestamp of when the session will expire, and an IP address of the device for which the session was established. To select an active session, a user may select a row from table 316. In some embodiments, a selected row may be indicated by a change in the background color of the selected row. Upon selecting the row, the user may interactive with other interactive elements of GUI 300 (e.g., interactive elements 306-310 and 314) to modify the session represented by the row.

GUI 300 may include interactive elements 311 (e.g., a drop-down list) and 312 (e.g., a text input field) that enable a user to search for, from amongst the the user's sessions, a subset of active sessions that match a particular criteria. For example, by entering "10.191.207.47" into interactive element 312 and selecting "Matches" in interactive element 311, a user may cause table 316 to display only active sessions whose associated devices have an IP address that matches the string "10.191.207.47."

Figure 5:
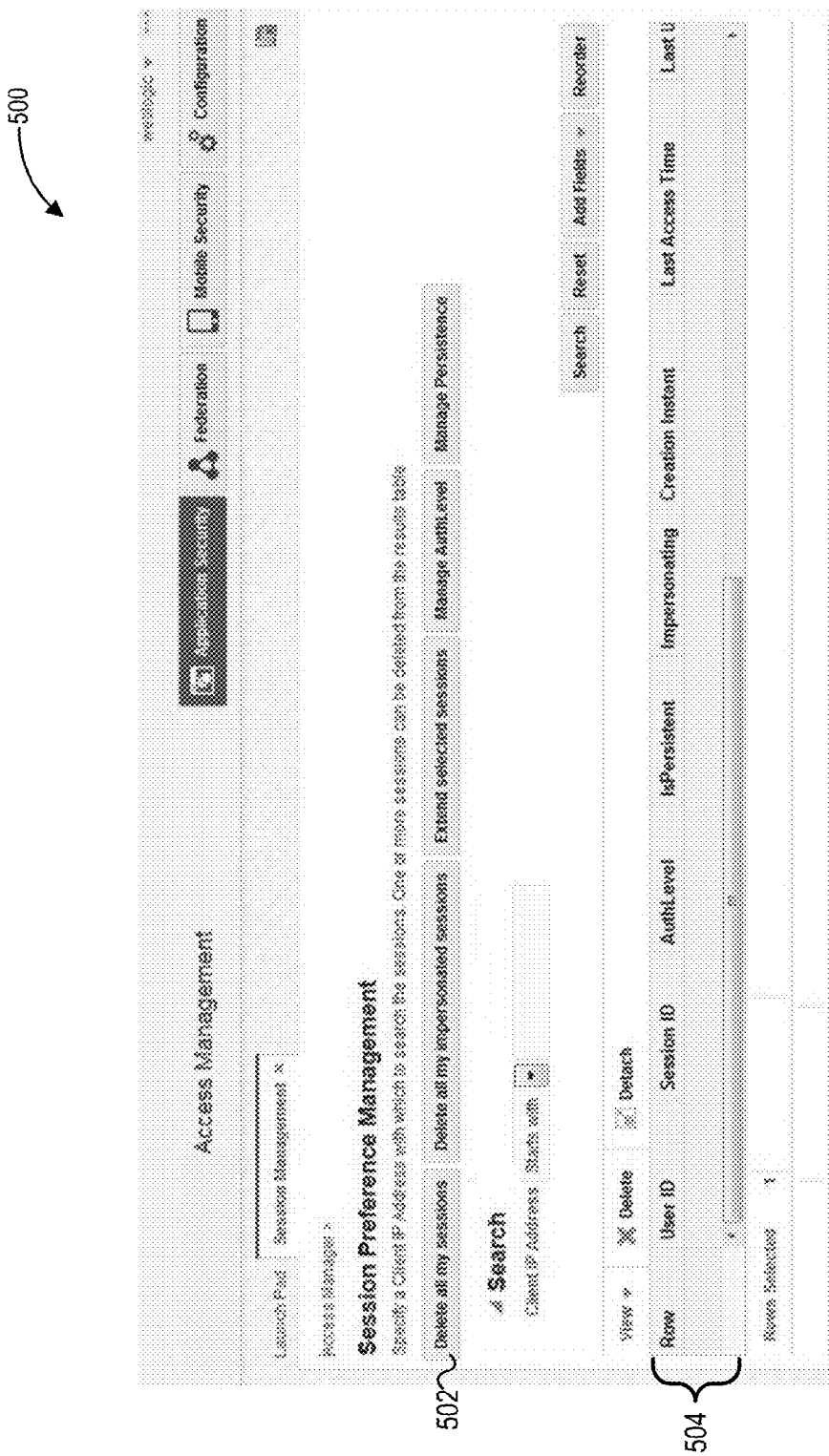

GUI 300 may include interactive element 302 (e.g., a button) that enables a user to terminate all active sessions that are associated with the user. By interacting with interactive element 302, a user may cause an access management system to terminate all of the user's sessions. Upon the deletion of the active sessions, a subsequent GUI may be presented to the user that indicates the deletion of the active session, an example of which is shown in FIG. 5.

GUI 300 may include interactive element 304 (e.g., a button) that enables a user to terminate all active impersonation sessions for which the user is the impersonatee. By interacting with interactive element 304, a user may cause an access management system to terminate all active sessions that are impersonation sessions (e.g., where the user is the impersonatee).

Figure 6:
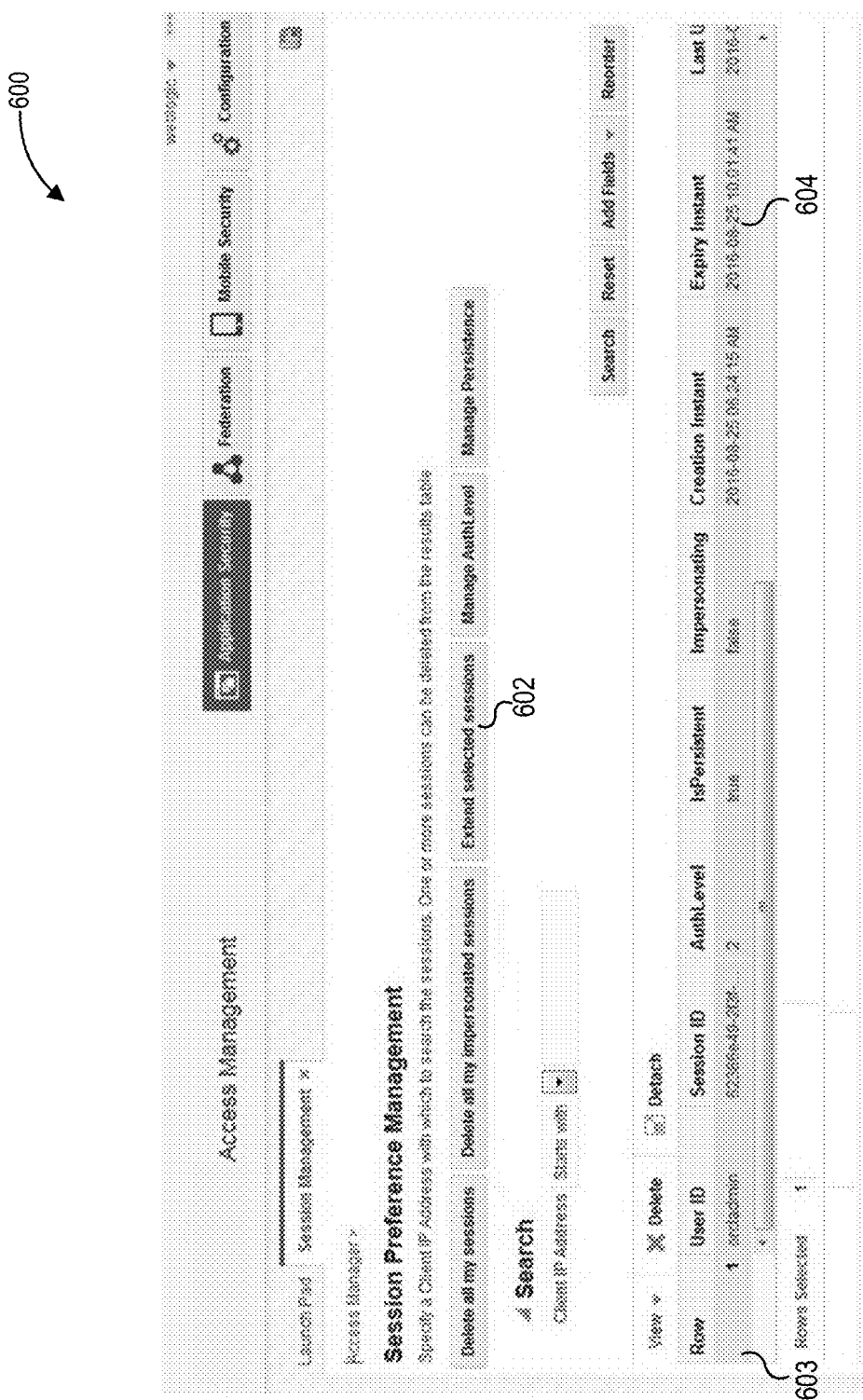

GUI 300 may include interactive element 306 (e.g., a button) that enables a user to extend a particular active session of the user. By selecting a session from table 316 and interacting with interactive element 306, a user may cause an access management system to increase the length of time for which the more selected sessions is active. Upon the extension of the session, a subsequent GUI may be presented to the user that reflects the extension of the session, an example of which is shown in FIG. 6.

Figure 7:
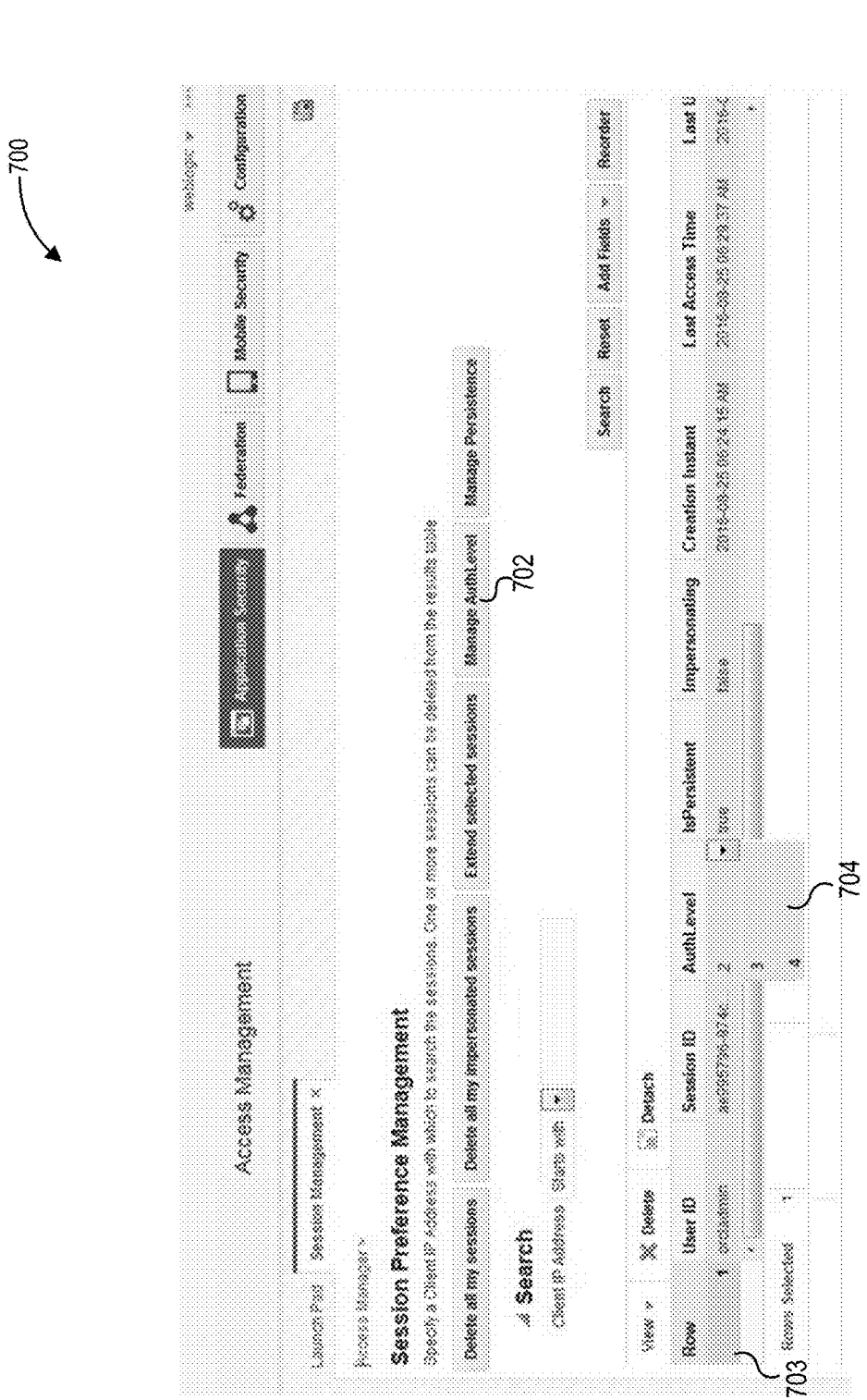

GUI 300 may include interactive element 308 that enables a user to change the authentication level of a session of the user. By selecting a session from table 316 and interacting with interactive element 308, a user may cause a subsequent GUI to be displayed to the user, an example of which is shown in FIG. 7. The subsequent GUI may enable the user to manage the authentication level of the selected session.

Figure 8:
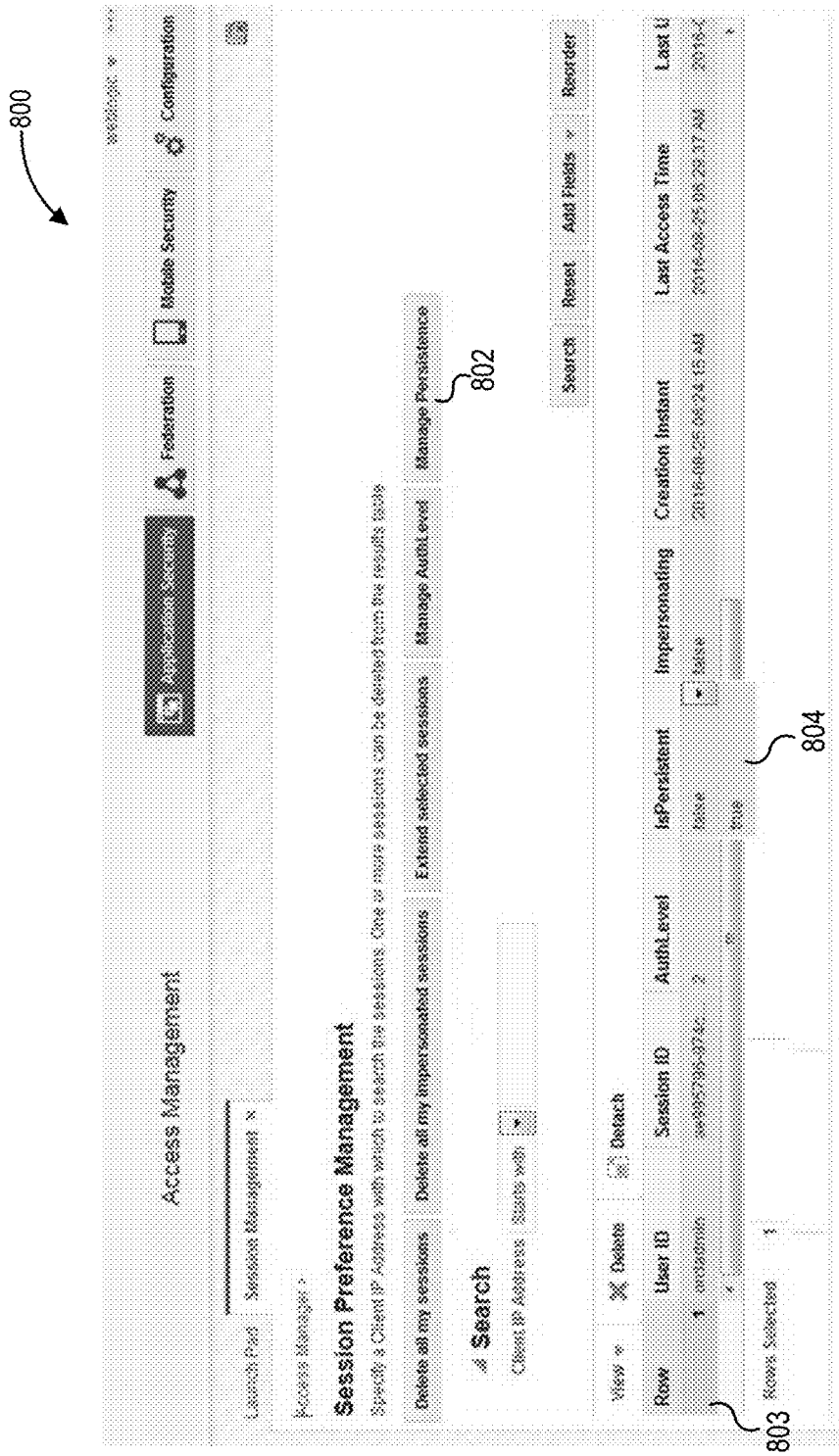

GUI 300 may include interactive element 310 that enables a user to toggle the persistence of a session of the user. By selecting a session from table 316 and interacting with interactive element 310, a user may cause a subsequent GUI to be displayed to the user, an example of which is shown in FIG. 8. The subsequent GUI may enable the user to manage the persistence of the selected session.

GUI 300 may include interactive element 314 that enables a user to terminate one or more of the user's sessions. By selecting one or more sessions from table 316 and interacting with interactive element 314, a user may have an access management system terminate the one or more selected sessions. Upon the deletion of the one or more selected sessions, a subsequent GUI may be presented to the user indicating that the one or more sessions are terminated.

Figure 4:
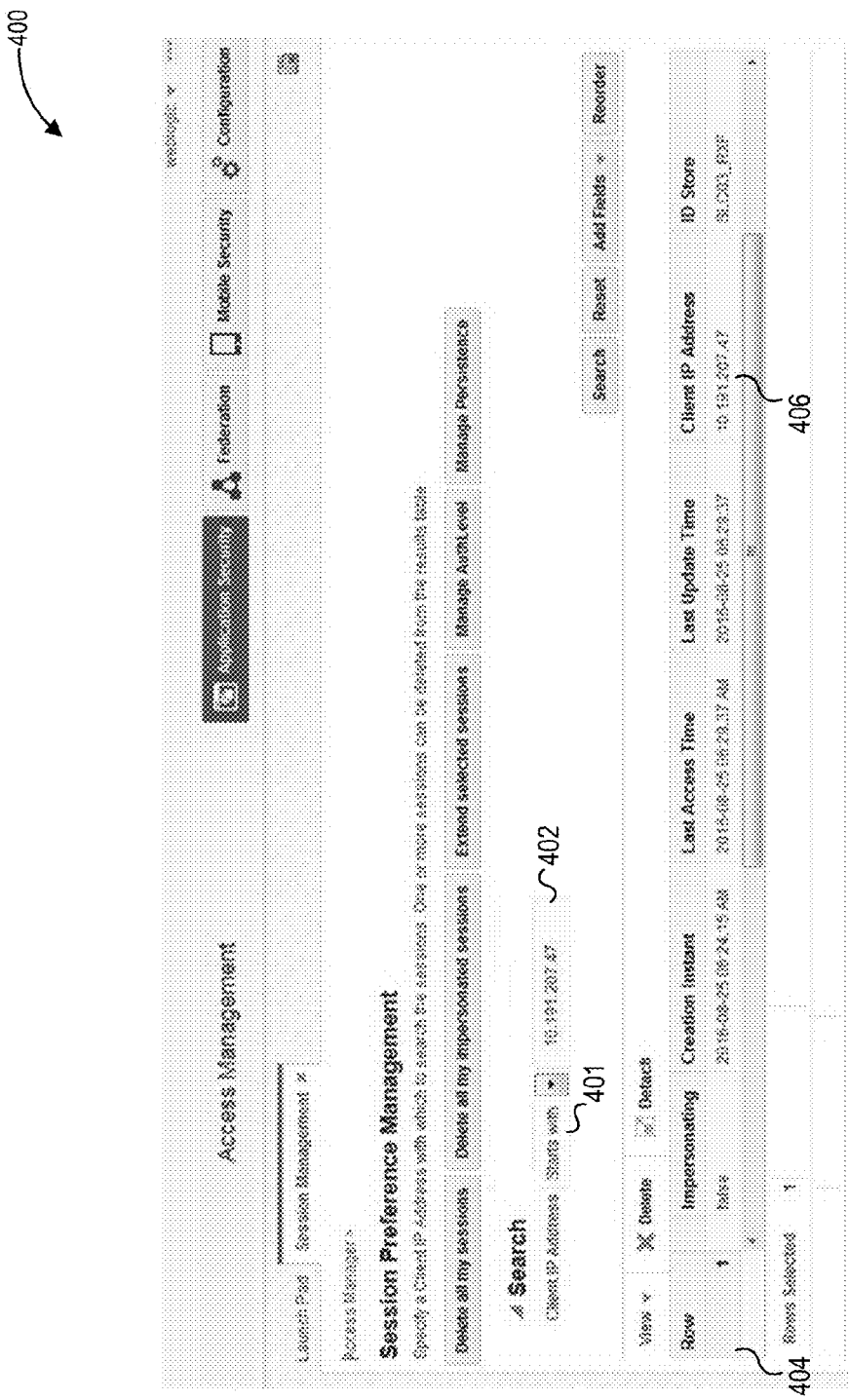

In FIG. 4, a GUI 400 is depicted that displays a search amongst a user's active sessions for a subset of sessions that match criteria provided by the user in accordance with an embodiment. A user provides input to interactive elements 401 and 402 that specifies a search for active sessions that are established for devices that have an IP address that starts with the string "10.191.207.47." In response to the input, GUI 400 is presented to the user. GUI 400 includes a table that displays only rows corresponding to active sessions that are established for devices that have an IP address that starts with the string "10.191.207.47." For example, row 404, which displays table cell 406 having client IP address "10.191.207.47" is displayed. It should be noted that in some embodiments, the search process may comprise only operations that are performed on the device (e.g., using client-side scripting such as Javascript). In other embodiments, the search process may include a step where the device sends an additional request to modify a session to the access management system, where the request specifies a search within the user's sessions according to the input provided to interactive elements 401 and 402. Upon receiving the request, the access management system may perform the search and return a response containing matching sessions to the device, which may cause the device to display GUI 400.

In FIG. 5, a GUI 500 is depicted that indicates the deletion of all the active sessions of a user in response to user input in accordance with an embodiment. A user interacts with interactive element 502, where the interaction may cause a request, which specifies that all of the user's sessions are to be terminated, to be sent to an access management system. Upon receiving the request, the access management system may terminate all of the user's sessions. In embodiments where all of the user's active sessions are terminated, GUI 500 is presented to the user. As shown in FIG. 5, GUI 500 includes table 504 which does not display any rows that correspond to active sessions.

It should be noted that in some alternative embodiments, the session used by the device to access the interface may be preserved to allow the user to continue self-service session management while all other sessions of the user are terminated.

In FIG. 6, a GUI 600 is depicted that indicates the extension of an active session of a user in response to user input in accordance with an embodiment. A user selects row 603 from a table and interacts with interactive element 602 to extend the session that corresponds to row 603. In particular, interactive element 602 may enable the user to modify an attribute of a session that corresponds to the session's expiration time. The input may cause a request to be sent to an access management system, where the request specifies that an expiration time of the session is to be delayed. Upon receiving the request, the access management system may delay the expiration time of the session. Upon the modification being applied to the session, GUI 600 is presented to the user, which may display an updated expiration time of the modified session in table cell 604.

In FIG. 7, a GUI 700 is depicted that enables a user to modify the authentication level of a session of the user in accordance with an embodiment. A user selects row 703 from a table and then interacts with interactive element 702 to manage the authentication level of the session that corresponds to row 703. In particular, interactive element 702 may enable the user to modify an attribute of a session that corresponds to the session's authentication level. It should be noted that for a row (e.g., row 703) that corresponds to a session of the user that is managed by an access management system, the tab within the row under the "AuthLevel" column may display the authentication level of that session. In response to the user's input, GUI 700 is presented to the user. GUI 700 includes interactive element 704 (e.g., a drop down list) that allows the user to select a desired authentication level for the selected session. Upon the selection of the desired authentication level from interactive element 704, a request may be sent to the access management system, where the request specifies that the authentication level of the selected session is to be the selected authentication level. Upon receiving the request, the access management system may change the authentication level in accordance with the selection.

In FIG. 8, a GUI 800 is depicted that enables a user to modify the persistence of a session of the user in accordance with an embodiment. A user selects row 803 from a table and then interacts with interactive element 802 to manage the persistence state of the session that corresponds to row 803. In particular, interactive element 802 may enable the user to modify an attribute of a session that corresponds to whether the session is persistent or not. It should be noted that for a row (e.g., row 803) that corresponds to a session of the user that is managed by an access management system, the tab within the row under the "IsPersistent" column may display the persistence state of that session. In response to the user's input, GUI 800 is presented to the user. GUI 800 includes interactive element 804 (e.g., a drop down list) that allows the user to toggle the persistence state of the selected session. Upon the selection of the desired persistence state from interactive element 804, a request may be sent to the access management system, where the request specifies that the persistence state of the selected session is to be toggled. Upon receiving the request, the access management system may toggle the persistence of the selected session in accordance with the selection.

Figure 9:
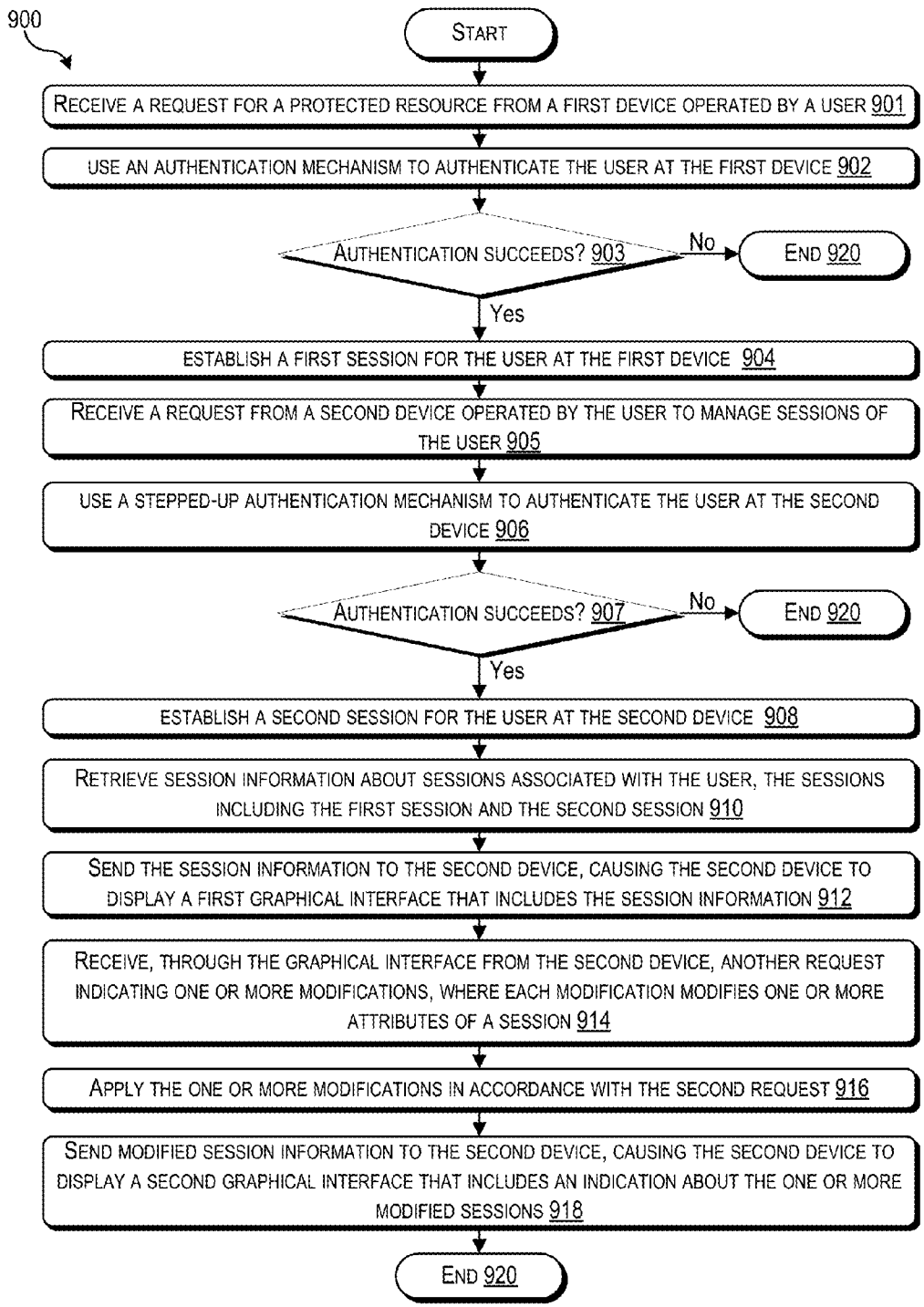
FIGS. 9-10 depict flowcharts illustrating a process for enabling a user to manage sessions associated with the user, in accordance with an embodiment.

FIG. 9 illustrates a flowchart 900 of a process for enabling a user to manage sessions associated with the user in accordance with an embodiment. In some embodiments, the process depicted in flowchart 900 may be implemented by access management system 110 of FIG. 1.

Flowchart 900 may begin at step 901 where a request for a protected resource is received from a first device that is operated by a user.

At step 902, upon receiving a request for a protected resource from a first device operated by a user, the access management system uses an authentication mechanism to authenticate the user to the first device. In particular, the authentication mechanism may include one or more authentication steps. If the authentication mechanism fails to authenticate the user, a session is not established for the user at the first device and the protected resource is not made available to the user at the first device.

At decision 903, a determination is made as to whether the authentication succeeds. If the authentication is unsuccessful, the flowchart ends at step 920.

At step 904, upon the authentication succeeding, the access management system establishes a first session for the user at the first device. The first session may enable the user to operate the first device to access the protected resource.

At step 905, the access management system receives, from a second device operated by the user, a request to manage the user's session.

At step 906, upon receiving the request from the second device, the access management system uses a stepped-up authentication mechanism to authenticate the user at the second device. In some cases, the second device may be a different device from the first device. For example, prior to step 906, the user may have ceased operating the first device and due one or more reasons (e.g., geographic distance between the user and the first device, the user lost the first device, the first device no longer operates) can no longer conveniently access the first device. Alternatively, the second device may be the same device as the first device. For example, the first session may be associated with a previous application that the user was using on the first device and the previous application crashed, making it inconvenient for the user to manage the first session (e.g., log out of the first session using the previous application). Thus, user may wish to access an interface to manage one or more sessions including the first session. The interface may be implemented or provided by a management engine (e.g., management engine 134 of FIG. 1) of the access management system). Because the interface can be used to modify and terminate active sessions, the interface may be considered an especially sensitive resource. For this and other reasons, the access management system may rely on a stepped-up authentication mechanism to authenticate a user that wishes to access the interface. In particular, the stepped-up authentication mechanism may (1) include additional steps (e.g., additional credential information, two-factor authentication, one-time passwords) over the one or more authentication steps of the authentication mechanism used in step 902. If the stepped up authentication mechanism fails to authenticate the user, a session is not established for the user at the second device and the interface is not made available to the user at the second device.

At step 907, a determination is made as to whether the stepped-up authentication succeeds. If the stepped-up authentication is unsuccessful, the flowchart ends at step 920.

At step 908, upon the stepped-up authentication succeeding, the access management system establishes a second session for the user at the second device. The second session may enable the user to operate the second device to access the interface.

At step 910, the access management system retrieves session information about sessions that are associated with the user, the sessions including the first and second session. As explained previously, the management engine of the access management system may communicate with a session engine (e.g., session engine 130) of the access management system to retrieve session information for sessions that the user established while operating one or more devices (the one or more devices including the first and second devices). The session information may be retrieved from a data store of the access management system (e.g., access sessions 112).

At step 912, the access management system sends the session information to the second device, causing the second device to display a first graphical interface that includes the session information. The first graphical interface may comprise one or more interactive elements that the user may select to specify changes to one or more of the active sessions shown in the graphical interface. GUI 300 of FIG. 3 is an example of such a graphical interface.

At step 914, the access management system receives, through the graphical interface from the second device, another request indicating a modification, where the modification modifies one or more attributes of a session. In particular, a modification may be specified by input made by the user on the interactive elements of the graphical interface.

At step 916, the access management system applies the modification to the session in accordance with the second request. The management engine may communicate with the session engine to apply the modification to the data store.

At step 918, the access management system may send modified information to the second device, causing the second device to display a second graphical interface that includes an indication of the one or more modified sessions. In particular, while the second graphical interface may comprise similar elements as the first graphical interface, at least some of the changes of the applied modification are made apparent by differences between the second graphical interface and the first graphical interface. For example, a terminated session may no longer appear in the second graphical interface while a change to a session attribute may be reflected in a graphical element of the graphical interface that corresponds to the session attribute.

The flowchart ends at step 920. At this point, the access management system may continue receiving requests from the device to make additional modifications to the user's sessions.

Figure 10:
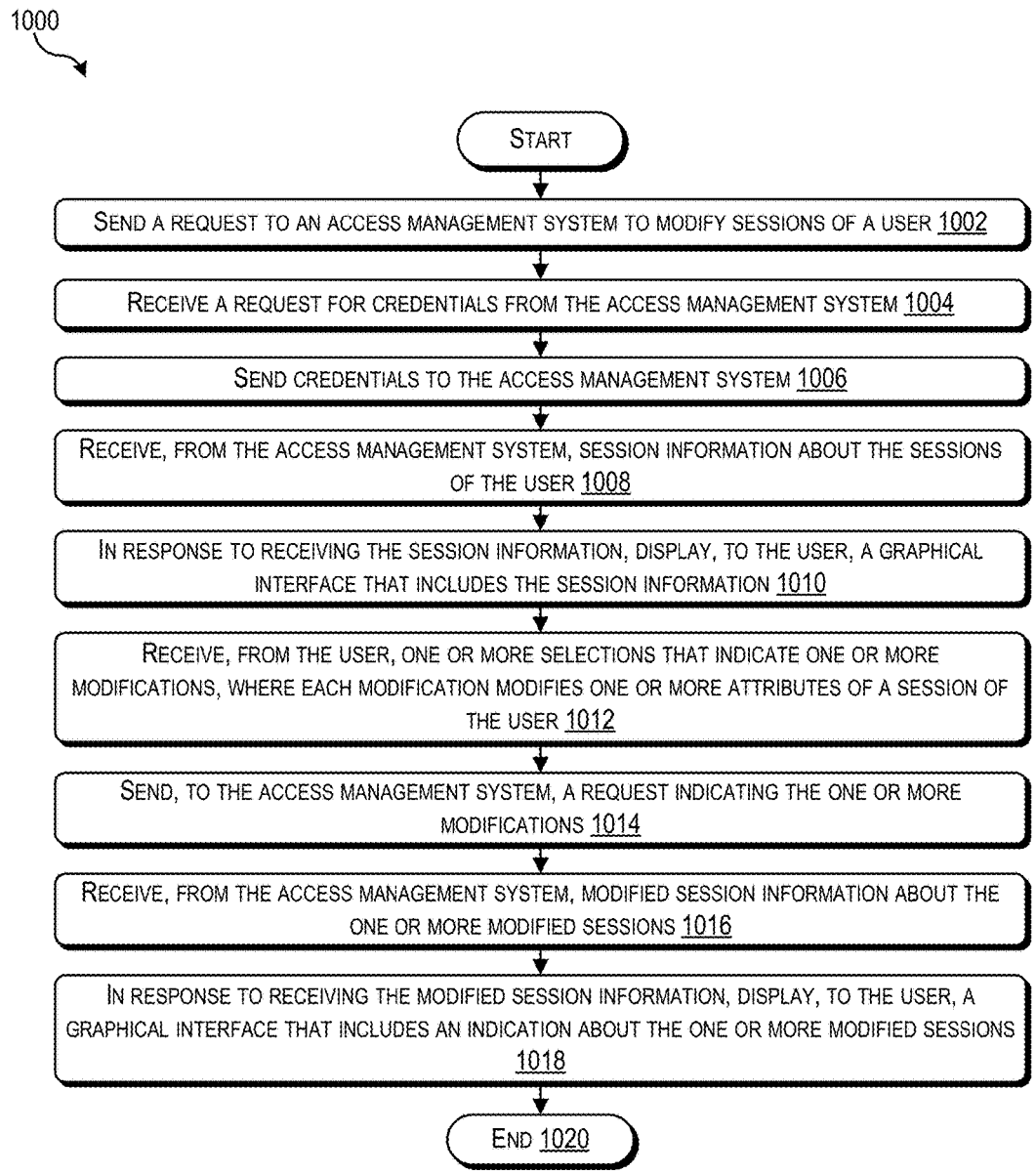

FIG. 10 illustrates a flowchart 1000 of a process for enabling a user to manage sessions associated with the user in accordance with an embodiment. In some embodiments, the process depicted in flowchart 1000 may be implemented by device 104 of FIG. 1.

At step 1002, the device, which is operated by a user, sends a request to an access management system to modify one or more of the user's sessions. At step 1004, the device receives a request for credentials from the access management system. The request for credentials may be one of the steps included in a stepped-up authentication mechanism used by the access management system to authenticate the user. At step 1006, the device sends credentials to the access management system. If the access management system is able to successfully validate the credentials, the user may be granted access to an interface provided by the access management system. Otherwise, access is denied to the user. At step 1008, the device receives, from the access management system, session information about the user's sessions. At step 1010, in response to receiving the session information, the device displays, to the user, a graphical interface that includes the session information. At step 1012, the device receives, from the user, input that indicate a modification, where the modification modifies one or more attributes of a session of the user. At step 1014, the device sends, to the access management system, a request indicating the one or more modifications. At step 1016, the device receives, from the access management system, modified session information about the one or more modified sessions. At step 1018, in response to receiving the modified session information, the device displays, to the user, a graphical interface that includes an indication about the one or more modified sessions.

The flowchart ends at step 1020. At this point, the user may continue interacting with the interface to make additional modifications to the user's sessions across one or more requests.

Figure 11:
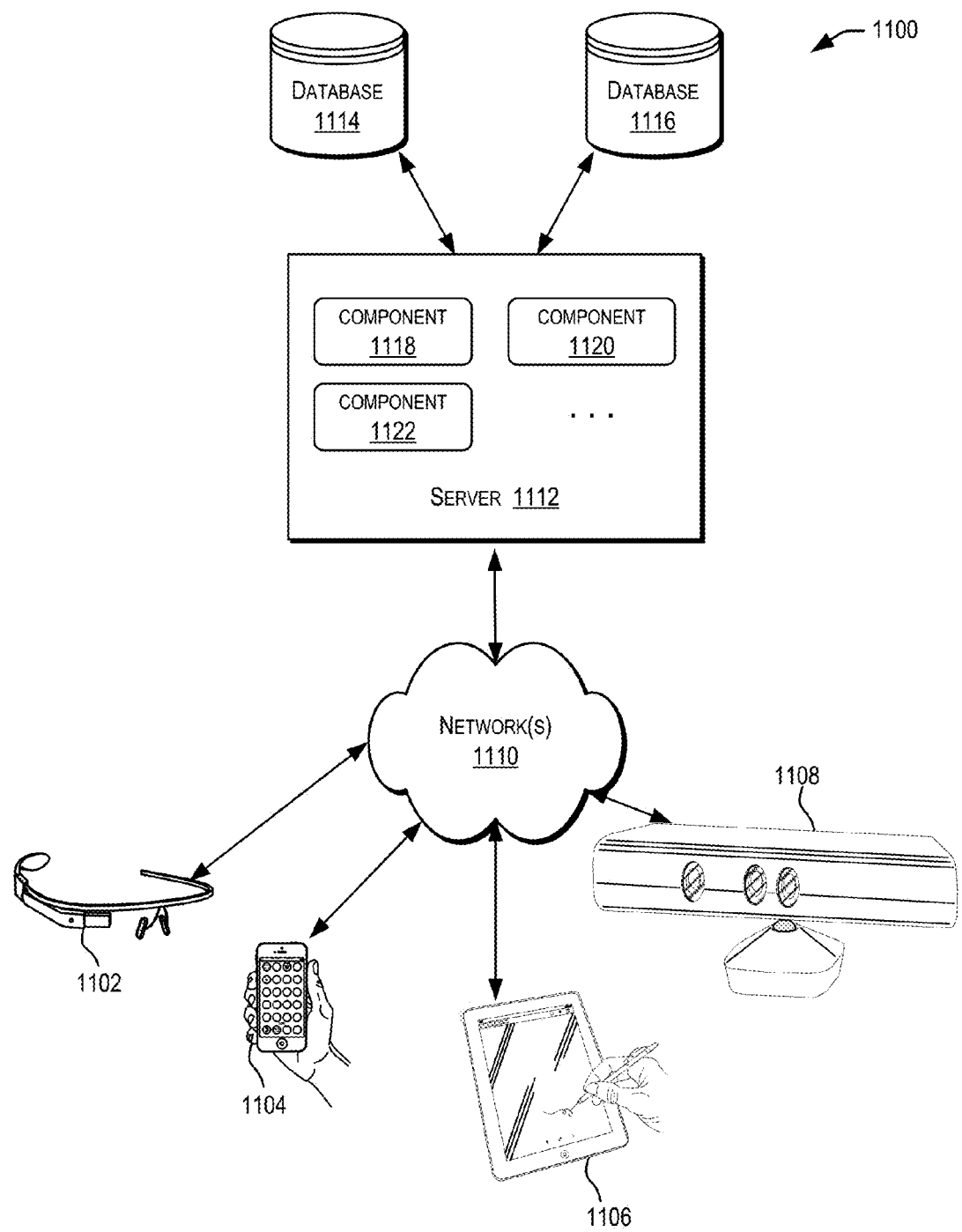
FIG. 11 depicts a simplified diagram of a distributed system for implementing an embodiment.

FIG. 11 depicts a simplified diagram of a distributed system 1100 for implementing an embodiment. In the illustrated embodiment, distributed system 1100 includes one or more client computing devices 1102, 1104, 1106, and 1108, which are configured to execute and operate a client application such as a web browser, proprietary client (e.g., Oracle Forms), or the like over one or more network(s) 1110. Server 1112 may be communicatively coupled with remote client computing devices 1102, 1104, 1106, and 1108 via network 1110.

In various embodiments, server 1112 may be adapted to run one or more services or software applications. In certain embodiments, server 1112 may also provide other services or software applications can include non-virtual and virtual environments. In some embodiments, these services may be offered as web-based or cloud services or under a Software as a Service (SaaS) model to the users of client computing devices 1102, 1104, 1106, and/or 1108. Users operating client computing devices 1102, 1104, 1106, and/or 1108 may in turn utilize one or more client applications to interact with server 1112 to utilize the services provided by these components.

In the configuration depicted in FIG. 11, software components 1118, 1120 and 1122 of system 1100 are shown as being implemented on server 1112. In other embodiments, one or more of the components of system 1100 and/or the services provided by these components may also be implemented by one or more of the client computing devices 1102, 1104, 1106, and/or 1108. Users operating the client computing devices may then utilize one or more client applications to use the services provided by these components. These components may be implemented in hardware, firmware, software, or combinations thereof. It should be appreciated that various different system configurations are possible, which may be different from distributed system 1100. The embodiment shown in FIG. 11 is thus one example of a distributed system for implementing an embodiment system and is not intended to be limiting.

Client computing devices 1102, 1104, 1106, and/or 1108 may include various types of computing systems. For example, a client computing device may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox gaming console with or without a Kinect® gesture input device), and/or a personal messaging device, capable of communicating over network(s) 1110.

Although distributed system 1100 in FIG. 11 is shown with four client computing devices, any number of client computing devices may be supported. Other devices, such as devices with sensors, etc., may interact with server 1112.

Network(s) 1110 in distributed system 1100 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, network(s) 1110 can be a local area network (LAN), networks based on Ethernet, Token-Ring, a wide-area network, the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol), and/or any combination of these and/or other networks.

Server 1112 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 1112 can include one or more virtual machines running virtual operating systems, or other computing architectures involving virtualization. One or more flexible pools of logical storage devices can be virtualized to maintain virtual storage devices for the server. Virtual networks can be controlled by server 1112 using software defined networking. In various embodiments, server 1112 may be adapted to run one or more services or software applications described in the foregoing disclosure. For example, server 1112 may correspond to a server for performing processing as described above according to an embodiment of the present disclosure.

Server 1112 may run an operating system including any of those discussed above, as well as any commercially available server operating system. Server 1112 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 1112 may include one or more applications to analyze and consolidate data feeds and/or event updates received from users of client computing devices 1102, 1104, 1106, and 1108. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1112 may also include one or more applications to display the data feeds and/or real-time events via one or more display devices of client computing devices 1102, 1104, 1106, and 1108.

Distributed system 1100 may also include one or more databases 1114 and 1116. These databases may provide a mechanism for storing information such as user interactions information, usage patterns information, adaptation rules information, and other information used by embodiments of the present disclosure. Databases 1114 and 1116 may reside in a variety of locations. By way of example, one or more of databases 1114 and 1116 may reside on a non-transitory storage medium local to (and/or resident in) server 1112. Alternatively, databases 1114 and 1116 may be remote from server 1112 and in communication with server 1112 via a network-based or dedicated connection. In one set of embodiments, databases 1114 and 1116 may reside in a storage-area network (SAN). Similarly, any necessary files for performing the functions attributed to server 1112 may be stored locally on server 1112 and/or remotely, as appropriate. In one set of embodiments, databases 1114 and 1116 may include relational databases, such as databases provided by Oracle that are adapted to store, update, and retrieve data in response to SQL-formatted commands.

Figure 12:
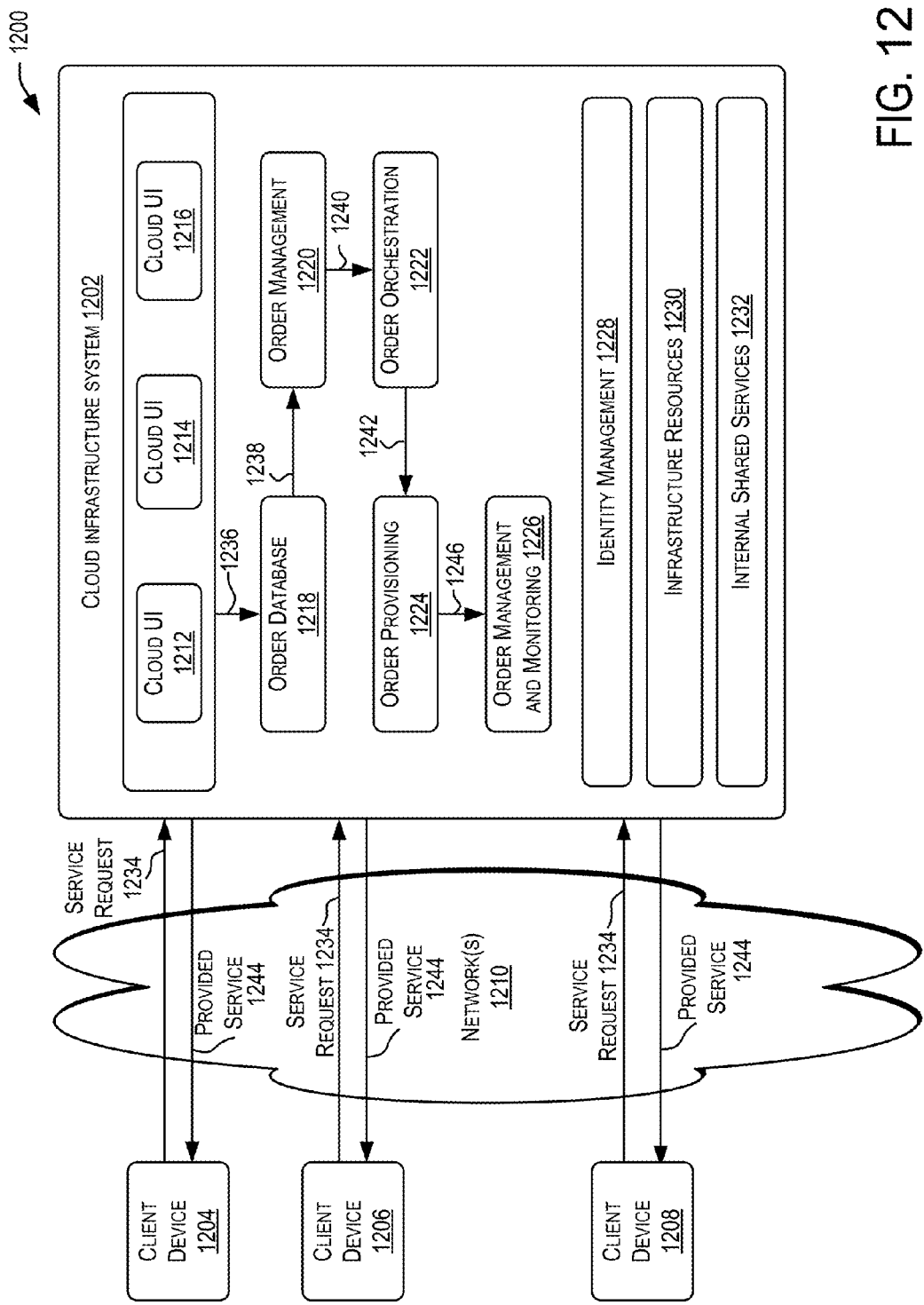
FIG. 12 illustrates a simplified block diagram of one or more components of a system environment in which services may be offered as cloud services, in accordance with an embodiment of the present disclosure.

In some embodiments, a cloud environment may provide one or more services. FIG. 12 is a simplified block diagram of one or more components of a system environment 1200 in which services may be offered as cloud services, in accordance with an embodiment of the present disclosure. In the illustrated embodiment in FIG. 12, system environment 1200 includes one or more client computing devices 1204, 1206, and 1208 that may be used by users to interact with a cloud infrastructure system 1202 that provides cloud services. Cloud infrastructure system 1202 may comprise one or more computers and/or servers that may include those described above for server 1212.

It should be appreciated that cloud infrastructure system 1202 depicted in FIG. 12 may have other components than those depicted. Further, the embodiment shown in FIG. 12 is only one example of a cloud infrastructure system that may incorporate an embodiment of the present disclosure. In some other embodiments, cloud infrastructure system 1202 may have more or fewer components than shown in the figure, may combine two or more components, or may have a different configuration or arrangement of components.

Client computing devices 1204, 1206, and 1208 may be devices similar to those described above. Client computing devices 1204, 1206, and 1208 may be configured to operate a client application such as a web browser, a proprietary client application (e.g., Oracle Forms), or some other application, which may be used by a user of the client computing device to interact with cloud infrastructure system 1202 to use services provided by cloud infrastructure system 1202. Although exemplary system environment 1200 is shown with three client computing devices, any number of client computing devices may be supported. Other devices such as devices with sensors, etc. may interact with cloud infrastructure system 1202.

Network(s) 1210 may facilitate communications and exchange of data between client computing devices 1204, 1206, and 1208 and cloud infrastructure system 1202. Each network may be any type of network familiar to those skilled in the art that can support data communications using any of a variety of commercially-available protocols, including those described above for network(s) 1010.

In certain embodiments, services provided by cloud infrastructure system 1202 may include a host of services that are made available to users of the cloud infrastructure system on demand. Various other services may also be offered including without limitation online data storage and backup solutions, Web-based e-mail services, hosted office suites and document collaboration services, database processing, managed technical support services, and the like. Services provided by the cloud infrastructure system can dynamically scale to meet the needs of its users.

In certain embodiments, a specific instantiation of a service provided by cloud infrastructure system 1202 may be referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1202 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Cloud infrastructure system 1202 may also provide "big data" elated computation and analysis services. The term "big data" is generally used to refer to extremely large data sets that can be stored and manipulated by analysts and researchers to visualize large amounts of data, detect trends, and/or otherwise interact with the data. This big data and related applications can be hosted and/or manipulated by an infrastructure system on many levels and at different scales. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an embodiment to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 1202 may be adapted to automatically provision, manage and track a customer's subscription to services offered by cloud infrastructure system 1202. Cloud infrastructure system 1202 may provide the cloud services via different deployment models. For example, services may be provided under a public cloud model in which cloud infrastructure system 1202 is owned by an organization selling cloud services (e.g., owned by Oracle Corporation) and the services are made available to the general public or different industry enterprises. As another example, services may be provided under a private cloud model in which cloud infrastructure system 1202 is operated solely for a single organization and may provide services for one or more entities within the organization. The cloud services may also be provided under a community cloud model in which cloud infrastructure system 1202 and the services provided by cloud infrastructure system 1202 are shared by several organizations in a related community. The cloud services may also be provided under a hybrid cloud model, which is a combination of two or more different models.

In some embodiments, the services provided by cloud infrastructure system 1202 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1202. Cloud infrastructure system 1202 then performs processing to provide the services in the customer's subscription order.

In some embodiments, the services provided by cloud infrastructure system 1202 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by cloud infrastructure system 1202 via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by cloud infrastructure system 1202 without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1202 may also include infrastructure resources 1230 for providing the resources used to provide various services to customers of the cloud infrastructure system. In one embodiment, infrastructure resources 1230 may include pre-integrated and optimized combinations of hardware, such as servers, storage, and networking resources to execute the services provided by the PaaS platform and the SaaS platform, and other resources.

In some embodiments, resources in cloud infrastructure system 1202 may be shared by multiple users and dynamically re-allocated per demand. Additionally, resources may be allocated to users in different time zones. For example, cloud infrastructure system 1202 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1232 may be provided that are shared by different components or modules of cloud infrastructure system 1202 to enable provision of services by cloud infrastructure system 1202. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1202 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1202, and the like.

In one embodiment, as depicted in FIG. 12, cloud management functionality may be provided by one or more modules, such as an order management module 1220, an order orchestration module 1222, an order provisioning module 1224, an order management and monitoring module 1226, and an identity management module 1228. These modules may include or be provided using one or more computers and/or servers, which may be general purpose computers, specialized server computers, server farms, server clusters, or any other appropriate arrangement and/or combination.

In an exemplary operation, at step 1234, a customer using a client device, such as client computing devices 1204, 1206 or 1208, may interact with cloud infrastructure system 1202 by requesting one or more services provided by cloud infrastructure system 1202 and placing an order for a subscription for one or more services offered by cloud infrastructure system 1202. In certain embodiments, the customer may access a cloud User Interface (UI) such as cloud UI 1212, cloud UI 1214 and/or cloud UI 1216 and place a subscription order via these UIs. The order information received by cloud infrastructure system 1202 in response to the customer placing an order may include information identifying the customer and one or more services offered by the cloud infrastructure system 1202 that the customer intends to subscribe to.

At step 1236, the order information received from the customer may be stored in an order database 1218. If this is a new order, a new record may be created for the order. In one embodiment, order database 1218 can be one of several databases operated by cloud infrastructure system 1218 and operated in conjunction with other system elements.

At step 1238, the order information may be forwarded to an order management module 1220 that may be configured to perform billing and accounting functions related to the order, such as verifying the order, and upon verification, booking the order.

At step 1240, information regarding the order may be communicated to an order orchestration module 1222 that is configured to orchestrate the provisioning of services and resources for the order placed by the customer. In some instances, order orchestration module 1222 may use the services of order provisioning module 1224 for the provisioning. In certain embodiments, order orchestration module 1222 enables the management of business processes associated with each order and applies business logic to determine whether an order should proceed to provisioning.

As shown in the embodiment depicted in FIG. 12, at step 1242, upon receiving an order for a new subscription, order orchestration module 1222 sends a request to order provisioning module 1224 to allocate resources and configure resources needed to fulfill the subscription order. Order provisioning module 1224 enables the allocation of resources for the services ordered by the customer. Order provisioning module 1224 provides a level of abstraction between the cloud services provided by cloud infrastructure system 1200 and the physical implementation layer that is used to provision the resources for providing the requested services. This enables order orchestration module 1222 to be isolated from implementation details, such as whether or not services and resources are actually provisioned on the fly or pre-provisioned and only allocated/assigned upon request.

At step 1244, once the services and resources are provisioned, a notification may be sent to the subscribing customers indicating that the requested service is now ready for use. In some instance, information (e.g. a link) may be sent to the customer that enables the customer to start using the requested services.

At step 1246, a customer's subscription order may be managed and tracked by an order management and monitoring module 1226. In some instances, order management and monitoring module 1226 may be configured to collect usage statistics regarding a customer use of subscribed services. For example, statistics may be collected for the amount of storage used, the amount data transferred, the number of users, and the amount of system up time and system down time, and the like.

In certain embodiments, cloud infrastructure system 1200 may include an identity management module 1228 that is configured to provide identity services, such as access management and authorization services in cloud infrastructure system 1200. In some embodiments, identity management module 1228 may control information about customers who wish to utilize the services provided by cloud infrastructure system 1202. Such information can include information that authenticates the identities of such customers and information that describes which actions those customers are authorized to perform relative to various system resources (e.g., files, directories, applications, communication ports, memory segments, etc.) Identity management module 1228 may also include the management of descriptive information about each customer and about how and by whom that descriptive information can be accessed and modified.

Figure 13:
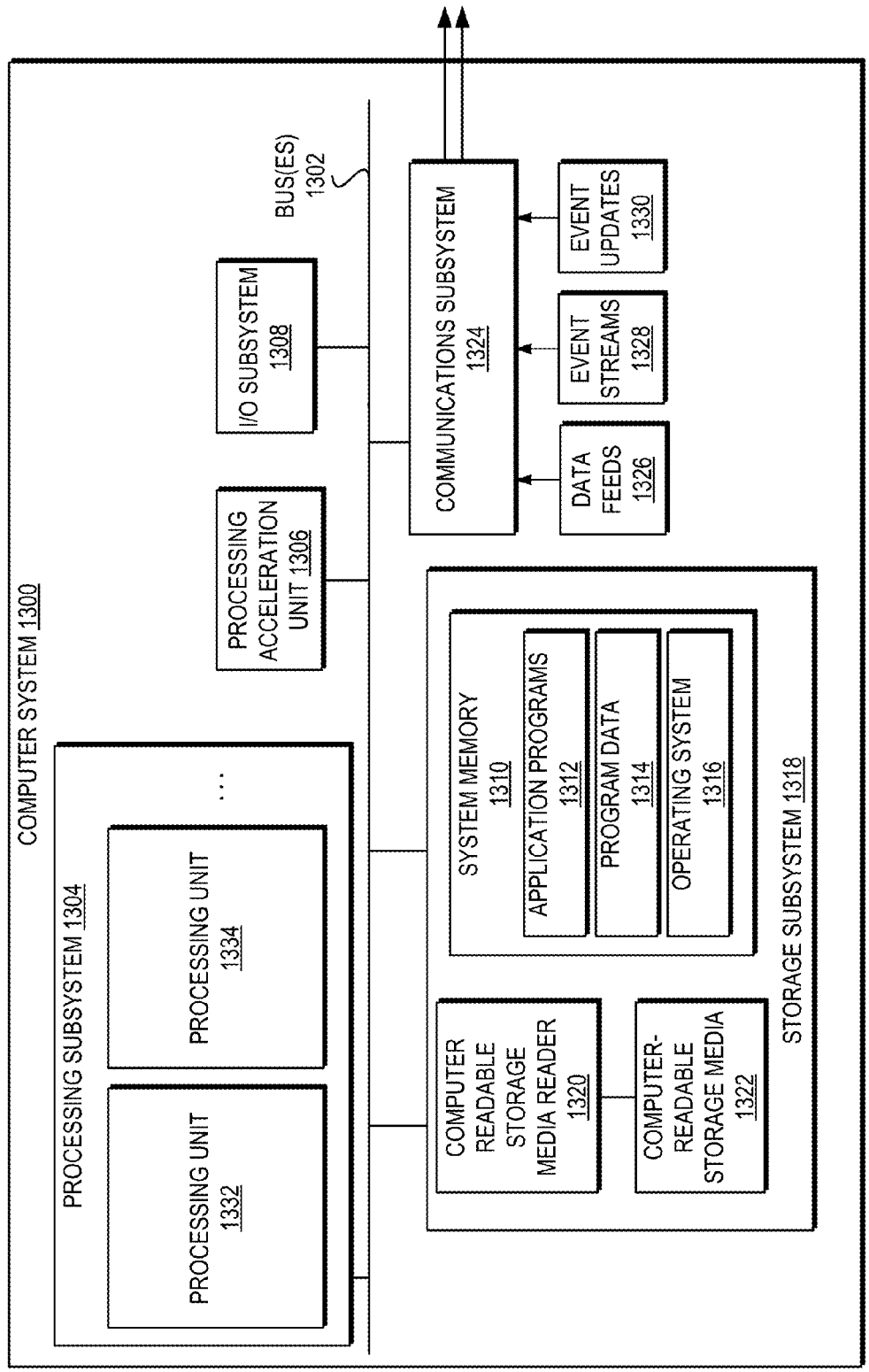
FIG. 13 illustrates an exemplary computer system that may be used to implement an embodiment of the present disclosure.

FIG. 13 illustrates an exemplary computer system 1300 that may be used to implement an embodiment of the present disclosure. In some embodiments, computer system 1300 may be used to implement any of the various servers and computer systems described above. As shown in FIG. 13, computer system 1300 includes various subsystems including a processing unit 1304 that communicates with a number of peripheral subsystems via a bus subsystem 1302. These peripheral subsystems may include a processing acceleration unit 1306, an I/O subsystem 1308, a storage subsystem 1318 and a communications subsystem 1324. Storage subsystem 1318 may include tangible computer-readable storage media 1322 and a system memory 1310.

Bus subsystem 1302 provides a mechanism for letting the various components and subsystems of computer system 1300 communicate with each other as intended. Although bus subsystem 1302 is shown schematically as a single bus, alternative embodiments of the bus subsystem may utilize multiple buses. Bus subsystem 1302 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 1304 controls the operation of computer system 1300 and may comprise one or more processing units 1332, 1334, etc. A processing unit may include be one or more processors, including single core or multicore processors, one or more cores of processors, or combinations thereof. In some embodiments, processing subsystem 1304 can include one or more special purpose co-processors such as graphics processors, digital signal processors (DSPs), or the like. In some embodiments, some or all of the processing units of processing subsystem 1304 can be implemented using customized circuits, such as application specific integrated circuits (ASICs), or field programmable gate arrays (FPGAs).

In some embodiments, the processing units in processing subsystem 1304 can execute instructions stored in system memory 1310 or on computer readable storage media 1322. In various embodiments, the processing units can execute a variety of programs or code instructions and can maintain multiple concurrently executing programs or processes. At any given time, some or all of the program code to be executed can be resident in system memory 1310 and/or on computer-readable storage media 1322 including potentially on one or more storage devices. Through suitable programming, processing subsystem 1304 can provide various functionalities.

In certain embodiments, a processing acceleration unit 1306 may be provided for performing customized processing or for off-loading some of the processing performed by processing subsystem 1304 so as to accelerate the overall processing performed by computer system 1300.

I/O subsystem 1308 may include devices and mechanisms for inputting information to computer system 1300 and/or for outputting information from or via computer system 1300. In general, use of the term "input device" is intended to include all possible types of devices and mechanisms for inputting information to computer system 1300. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1300 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1318 provides a repository or data store for storing information that is used by computer system 1300. Storage subsystem 1318 provides a tangible non-transitory computer-readable storage medium for storing the basic programming and data constructs that provide the functionality of some embodiments. Software (programs, code modules, instructions) that when executed by processing subsystem 1304 provide the functionality described above may be stored in storage subsystem 1318. The software may be executed by one or more processing units of processing subsystem 1304. Storage subsystem 1318 may also provide a repository for storing data used in accordance with the present disclosure.

Storage subsystem 1318 may include one or more non-transitory memory devices, including volatile and non-volatile memory devices. As shown in FIG. 13, storage subsystem 1318 includes a system memory 1310 and a computer-readable storage media 1322. System memory 1310 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1300, such as during start-up, may typically be stored in the ROM. The RAM typically contains data and/or program modules that are presently being operated and executed by processing subsystem 1304. In some implementations, system memory 1310 may include multiple different types of memory, such as static random access memory (SRAM) or dynamic random access memory (DRAM).

By way of example, and not limitation, as depicted in FIG. 13, system memory 1310 may store application programs 1312, which may include client applications, Web browsers, mid-tier applications, relational database management systems (RDBMS), etc., program data 1314, and an operating system 1316. By way of example, operating system 1316 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 1322 may store programming and data constructs that provide the functionality of some embodiments. Software (programs, code modules, instructions) that when executed by processing subsystem 1304 a processor provide the functionality described above may be stored in storage subsystem 1318. By way of example, computer-readable storage media 1322 may include non-volatile memory such as a hard disk drive, a magnetic disk drive, an optical disk drive such as a CD ROM, DVD, a Blu-Ray® disk, or other optical media. Computer-readable storage media 1322 may include, but is not limited to, Zip® drives, flash memory cards, universal serial bus (USB) flash drives, secure digital (SD) cards, DVD disks, digital video tape, and the like. Computer-readable storage media 1322 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 1322 may provide storage of computer-readable instructions, data structures, program modules, and other data for computer system 1300.

In certain embodiments, storage subsystem 1300 may also include a computer-readable storage media reader 1320 that can further be connected to computer-readable storage media 1322. Together and, optionally, in combination with system memory 1310, computer-readable storage media 1322 may comprehensively represent remote, local, fixed, and/or removable storage devices plus storage media for storing computer-readable information.

In certain embodiments, computer system 1300 may provide support for executing one or more virtual machines. Computer system 1300 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 1300. Accordingly, multiple operating systems may potentially be run concurrently by computer system 1300. Each virtual machine generally runs independently of the other virtual machines.

Communications subsystem 1324 provides an interface to other computer systems and networks. Communications subsystem 1324 serves as an interface for receiving data from and transmitting data to other systems from computer system 1300. For example, communications subsystem 1324 may enable computer system 1300 to establish a communication channel to one or more client computing devices via the Internet for receiving and sending information from and to the client computing devices.

Communication subsystem 1324 may support both wired and/or wireless communication protocols. For example, in certain embodiments, communications subsystem 1324 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1324 can provide wired network connectivity (e.g., Ethernet) in addition to or instead of a wireless interface.

Communication subsystem 1324 can receive and transmit data in various forms. For example, in some embodiments, communications subsystem 1324 may receive input communication in the form of structured and/or unstructured data feeds 1326, event streams 1328, event updates 1330, and the like. For example, communications subsystem 1324 may be configured to receive (or send) data feeds 1326 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 1324 may be configured to receive data in the form of continuous data streams, which may include event streams 1328 of real-time events and/or event updates 1330, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1324 may also be configured to output the structured and/or unstructured data feeds 1326, event streams 1328, event updates 1330, and the like to one or more databases that may be in communication with one or more streaming data source computers coupled to computer system 1300.

Computer system 1300 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 1300 depicted in FIG. 13 is intended only as a specific example. Many other configurations having more or fewer components than the system depicted in FIG. 13 are possible. Based on the disclosure and teachings provided herein, a person of ordinary skill in the art will appreciate other ways and/or methods to implement the various embodiments.

Although specific embodiments of the present disclosure have been described, various modifications, alterations, alternative constructions, and equivalents are also encompassed within the scope of the present disclosure. The modifications include any relevant combination of the disclosed features. Embodiments of the present disclosure are not restricted to operation within certain specific data processing environments, but are free to operate within a plurality of data processing environments. Additionally, although embodiments of the present disclosure have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments of the present disclosure have been described using a particular combination of hardware and software, it should be recognized that other combinations of hardware and software are also within the scope of the present disclosure. Embodiments of the present disclosure may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for interprocess communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A method comprising:
   receiving, by a computer system of an access management system, a first request from a first device to manage one or more sessions established for a user;
   responsive to the receiving, establishing a first session for the user for the first device upon successful authentication of the user, the first session enabling the user to access a session management interface for managing the one or more sessions established for the user;
   accessing session information about the one or more sessions that are established for the user;
   sending, by the computer system, the session information to the first device, wherein the first device displays a graphical interface outputting the session information;
   receiving, from the first device, a second request requesting a modification to an attribute of a second session from the one or more sessions established for the user, the second session established for the user for a second device upon successful authentication of the user, the second request generated using the session management interface;
   changing the attribute of the second session in accordance with the modification requested in the second request; and
   sending, by the computer system, to the first device, modified session information about the one or more sessions established for the user, the modified session information indicating the change made to the attribute of the second session, wherein the first device modifies the graphical interface to output the modified session information.

2. The method of claim 1, wherein the authentication of the user corresponds to a first authentication, and wherein prior to the first request, the method further comprises:
   determining a second authentication of the user to access one or more resources at the second device; and
   establishing the second session for the user at the second device.

3. The method of claim 2, wherein the second device is different from the first device.

4. The method of claim 2, wherein the second device is the first device.

5. The method of claim 2, wherein the one or more sessions is a plurality of sessions, and wherein each of the plurality of sessions is created for the user at a different one of a plurality of devices.

6. The method of claim 2, wherein the first authentication is determined based on a first authentication process and a second authentication process, and wherein the second authentication is determined based on the first authentication process.

7. The method of claim 1, wherein the first request is by a first user at the first device, and wherein the user corresponds to a second user who is different from the first user.

8. The method of claim 1, wherein the session information comprises:
   an Internet protocol (IP) address of the second device;
   a time period during which the second session is configured to be active;
   an indication of whether the second session is persistent;
   an indication of whether the second session is impersonated;
   an authentication level of the second session;
   an identifier of the second session;
   an identifier of the user, or
   a combination thereof.

9. The method of claim 1, wherein the one or more sessions is a plurality of sessions, wherein the session information is a first session information, and wherein prior to receiving the second request, the method further comprises:
   receiving, from the first device, a third request to identify, from amongst the plurality of sessions, a subset of sessions associated with an IP address;
   searching for the subset of sessions based on the third request; and
   sending a second session information about the subset of sessions to the first device, wherein the first device displays an indication about the subset of sessions based on the second session information sent to the first device.

10. The method of claim 2,
   wherein the one or more resources includes a first resource and a second resource, wherein access to the first resource is based on a first authentication level having a first authentication process, and wherein access to the second resource is based on a second authentication level having a second authentication process, the second authentication process involving additional authentication in addition to the first authentication process;
   wherein the second session has the second authentication level; and
   wherein the modification comprises changing an authentication level of the second session from the second authentication level to the first authentication level to revoke the access to the second resource for the second session at the second device.

11. The method of claim 2,
   wherein the one or more resources includes a first resource and does not comprise a second resource, wherein access to the first resource is based on a first authentication level having a first authentication process and access to the second resource is based on a second authentication level having a second authentication process, the second authentication process involving additional authentication in addition to the first authentication process;
   wherein the second session has the first authentication level; and
   wherein the modification comprises changing an authentication level of the second session from the first authentication level to the second authentication level to provide the access to the second resource for the second session at the second device.

12. The method of claim 1, wherein the attribute is a time period, wherein the change to the attribute corresponds to extending the time period, and wherein the second session is active for the time period based on the change.

13. A system comprising:
   one or more processors; and
   a memory accessible to the one or more processors, the memory storing one or more instructions that, upon execution by the one or more processors, causes the one or more processors to:
     receive a first request from a first device to manage one or more sessions established for a user;
     responsive to the receiving, establish a first session for the user for the first device upon successful authentication of the user, the first session enabling the user to access a session management interface for managing the one or more sessions established for the user;
     access session information about the one or more sessions that are established for the user;
     send the session information to the first device, wherein the first device displays a graphical interface outputting the session information;
     receive, from the first device, a second request requesting a modification to an attribute of a second session from the one or more sessions established for the user, the second session established for the user for a second device upon successful authentication of the user, the second request generated using the session management interface;
     change the attribute of the second session in accordance with the modification requested in the second request; and
     send, to the first device, modified session information about the one or more sessions the established for the user, wherein the first device modifies the graphical interface to output the modified session information.

14. The system of claim 13, wherein the authentication of the user corresponds to a first authentication, and wherein the one or more instructions, upon execution by the one or more processors, further causes the one or more processors to:
   prior to the first request:
     determine a second authentication of the user to access one or more resources at the second device; and
     establish the second session for the user at the second device.

15. The system of claim 14, wherein the one or more sessions is a plurality of sessions, and wherein each of the plurality of sessions is created for the user at a different one of a plurality of devices.

16. The system of claim 14, wherein the first authentication is determined based on a first authentication process and a second authentication process, and wherein the second authentication is determined based on the first authentication process.

17. The system of claim 13, wherein the session information comprises:
- an Internet protocol (IP) address of the second device;
- a time period during which the second session is configured to be active;
- an indication of whether the second session is persistent;
- an indication of whether the second session is impersonated;
- an authentication level of the second session;
- an identifier of the second session;
- an identifier of the user, or
- a combination thereof.

18. The system of claim 15, wherein the one or more instructions, upon execution by the one or more processors, further causes the one or more processors to:
- prior to the second request:
  - receive, from the first device, a third request to identify, from amongst the plurality of sessions, a subset of sessions associated with an IP address;
  - search for the subset of sessions based on the third request; and
  - send a second session information about the subset of sessions to the first device, wherein the first device displays an indication about the subset of sessions based on the second session information sent to the first device.

19. A non-transitory computer-readable medium storing one or more instructions that, upon execution by one or more processors, causes the one or more processors to:
- receive a first request from a first device to manage one or more sessions established for a user;
- responsive to the receiving, establish a first session for the user for the first device upon successful authentication of the user, the first session enabling the user to access a session management interface for managing the one or more sessions established for the user;
- access session information about the one or more sessions that are established for the user;
- send the session information to the first device, wherein the first device displays a graphical interface outputting the session information;
- receive, from the first device, a second request requesting a modification to an attribute of a second session from the one or more sessions established for the user, the second session established for the user for a second device upon successful authentication of the user, the second request generated using the session management interface;
- change the attribute of the second session in accordance with the modification requested in the second request; and
- send, to the first device, modified session information about the one or more sessions established for the user, wherein the first device modifies the graphical interface to output the modified session information.

20. The non-transitory computer-readable medium of claim 19, wherein the authentication of the user corresponds to a first authentication, and wherein the one or more instructions, upon execution by one or more processors, further causes the one or more processors to:
- prior to the first request:
  - determine a second authentication of the user to access one or more resources at the second device; and
  - establish the second session for the user at the second device.

* * * * *

UNITED STATES PATENT AND TRADEMARK OFFICE
CERTIFICATE OF CORRECTION

Page 1 of 2

PATENT NO. : 10,623,501 B2
APPLICATION NO. : 15/356384
DATED : April 14, 2020
INVENTOR(S) : Mathew et al.

It is certified that error appears in the above-identified patent and that said Letters Patent is hereby corrected as shown below:

In the Specification

In Column 4, Line 6, delete "about about" and insert -- about --, therefor.

In Columns 7-8, Lines 53-67 (Column 7) 1-16 (Column 8), delete "In some embodiments, access management system 110 may include several subsystems and/or modules. For example, access management system 110 may include session engine 130, authorization engine 132, management engine 134, each of which may be implemented in hardware, software (e.g., program code, instructions executable by a processor) executing on hardware, or combinations thereof. In some embodiments, the software may be stored in a memory (e.g., a non-transitory computer-readable medium), on a memory device, or some other physical memory and may be executed by one or more processing units (e.g., one or more processors, one or more processor cores, one or more GPUs, etc.). Computer-executable instructions or firmware implementations of the processing unit(s) may include computers-executable or machine-executable instructions written in any suitable programming language to perform the various operations, functions, methods, and/or processes described herein. The memory may store program instructions that are loadable and executable on the processing unit(s), as well as data generated during the execution of these programs. The memory may be volatile (such as random access memory (RAM)) and/or non-volatile (such as read-only memory (ROM), flash memory, etc.). The memory may be implemented using any type of persistent storage device, such as computer-readable storage media. In some embodiments, computer-readable storage media may be configured to protect a computer from an electronic communication containing malicious code. The computer-readable storage media may include instructions stored thereon, that when executed on a processor, perform the operations described herein." and insert the same on Column 7, Line 52 as a continuation of same paragraph.

In Column 12, Line 25, delete "compontent." and insert -- component. --, therefor.

In Column 16, Line 12, delete "the the" and insert -- the --, therefor.

Signed and Sealed this
Thirteenth Day of April, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,623,501 B2

In Column 19, Line 49, delete "the the" and insert -- the --, therefor.

In Column 21, Line 53, delete "the the" and insert -- the --, therefor.

In the Claims

In Column 40, Line 45, in Claim 13, after "sessions" delete "the".